(12) United States Patent
Holtcamp et al.

(10) Patent No.: US 10,647,798 B2
(45) Date of Patent: May 12, 2020

(54) SPRAY-DRIED OLEFIN POLYMERIZATION CATALYST COMPOSITIONS AND POLYMERIZATION PROCESSES FOR USING THE SAME

(71) Applicant: ExxonMobil Chemical Patents Inc., Baytown, TX (US)

(72) Inventors: Matthew W. Holtcamp, Huffman, TX (US); Quanchang Li, Dayton, NJ (US); David C. Calabro, Bridgewater, NJ (US); Gerardo J. Majano Sanchez, Raritan, NJ (US); Machteld M. Mertens, Boortmeerbeek (BE); Charles J. Harlan, Houston, TX (US)

(73) Assignee: ExxonMobil Chemical Patents, Inc., Baytown, TX (US)

( * ) Notice: Subject to any disclaimer, the term of this patent is extended or adjusted under 35 U.S.C. 154(b) by 106 days.

(21) Appl. No.: 15/808,430

(22) Filed: Nov. 9, 2017

(65) Prior Publication Data

US 2018/0179310 A1    Jun. 28, 2018

Related U.S. Application Data

(60) Provisional application No. 62/437,803, filed on Dec. 22, 2016.

(51) Int. Cl.
*C08F 210/16* (2006.01)
*C08F 4/6592* (2006.01)
*C08F 4/659* (2006.01)

(52) U.S. Cl.
CPC ........ *C08F 210/16* (2013.01); *C08F 4/65912* (2013.01); *C08F 4/65925* (2013.01)

(58) Field of Classification Search
CPC .................................................. C08F 210/16
See application file for complete search history.

(56) References Cited

U.S. PATENT DOCUMENTS

| 6,180,736 | B1 | 1/2001 | Muhle et al. |
| 2011/0130531 | A1 | 6/2011 | Hussein et al. |
| 2015/0133615 | A1* | 5/2015 | Mariott ............ C08F 10/00 526/172 |

FOREIGN PATENT DOCUMENTS

| WO | 03/102037 A | 12/2003 |
| WO | 2016/094770 A | 6/2016 |
| WO | 2016/094774 A | 6/2016 |
| WO | 2016/094843 A | 6/2016 |
| WO | 2016/094861 A | 6/2016 |
| WO | 2016/094866 A | 6/2016 |
| WO | 2016/094870 A | 6/2016 |

OTHER PUBLICATIONS

Studies in Surface Science and Catalysis 123, Catalysis: An Integrated Approach, van Santen et al. (eds.), Elsevier 2000, p. 450. (Year: 2000).*
Ide, Matthias et al. "Developing a new and versatile ordered mesoporous organosilica as a pH and temperature stable chromatographic packing material", RSC Advances, vol. 5, Issue 8, pp. 5546-5552, ISSN: 2046-2069, DOI: 10.1039/c4ra15837g.

* cited by examiner

*Primary Examiner* — Catherine S Branch
(74) *Attorney, Agent, or Firm* — ExxonMobil Chemical Patents, Inc.—Law Department

(57) ABSTRACT

Disclosed herein are spray-dried catalyst compositions including one or more olefin polymerization catalysts and at least one support of an organosilica material, optionally, with at least one activator. The spray-dried catalyst compositions may be used in polymerization processes for the production of polyolefin polymers.

24 Claims, No Drawings

SPRAY-DRIED OLEFIN POLYMERIZATION CATALYST COMPOSITIONS AND POLYMERIZATION PROCESSES FOR USING THE SAME

CROSS REFERENCE TO RELATED APPLICATIONS

This application claims the benefit of Ser. No. 62/437,803, filed Dec. 22, 2016, the disclosure of which is hereby incorporated by reference in its entirety.

FIELD OF THE INVENTION

The present disclosure relates to spray-dried olefin polymerization catalyst compositions comprising one or more olefin polymerization catalysts and at least one organosilica material support, optionally, with at least one activator. The disclosure also relates to polymerization processes for using the spray-dried olefin polymerization catalyst compositions to produce polyolefin polymers.

BACKGROUND OF THE INVENTION

Supported olefin polymerization catalysts are of great use in industry. Hence, there is interest in finding new supported catalyst systems that increase the commercial usefulness of the catalyst and allow the production of polymers having improved properties.

Catalysts for olefin polymerization are often based on cyclopentadienyl based transition metal compounds as catalyst precursors, which are activated either with alumoxane or with an activator containing a non-coordinating anion.

Porous inorganic solids have found great utility as catalyst supports. In particular, mesoporous materials, such as silicas and aluminas, having a periodic arrangement of mesopores are attractive materials for use in adsorption, separation and catalytic processes due to their uniform and tunable pores, high surface areas, and large pore volumes. The pore structure of such mesoporous materials is large enough to adsorb large molecules and the pore wall structure can be as thin as about 1 nm. Further, such mesoporous materials are known to have large specific surface areas (e.g., 1000 m$^2$/g) and large pore volumes (e.g., 1 cc/g). For these reasons, such mesoporous materials enable reactive catalysts, adsorbents composed of a functional organic compound, and other molecules to rapidly diffuse into the pores and therefore, can be advantageous over other materials that have smaller pore sizes. Consequently, such mesoporous materials can be useful not only for catalysis of high-speed catalytic reactions, but also as large capacity adsorbents.

For example, mesoporous organosilica (MOS) supports are conventionally formed by the "self-assembly" of a silsequioxane precursor in the presence of a structure directing agent, porogen and/or framework element. The precursor is hydrolysable and condenses around the structure directing agent. See WO 2016/094770 and WO 2016/094774.

MOS supports have shown much potential as supports for olefin polymerization catalysts. WO 2016/094870 discloses the use of MOS supports with olefin polymerization catalysts having nitrogen linkages. WO 2016/094861 discloses the use of MOS supports with olefin polymerization catalysts including phenoxide transition metal compounds. WO 2016/094866 discloses the use of MOS supports with olefin polymerization catalysts having at least one nitrogen linkage and at least one oxygen linkage to a transition metal. WO 2016/094843 discloses the use of MOS supports with olefin polymerization catalysts including metallocene catalysts and/or Ziegler-Natta catalysts.

However, there remains a need in the art for new and improved supported olefin polymerization catalysts that improve the activity and tunability of supported olefin polymerization catalysts.

SUMMARY OF THE INVENTION

In a class of embodiments, the invention provides for a spray-dried catalyst composition comprising the product of: one or more olefin polymerization catalysts; at least one catalyst support comprising an organosilica material that is a polymer of at least one monomer of the Formula $[Z^1OZ^2SiCH_2]_3$ (I), wherein $Z^1$ represents a hydrogen atom, a $C_1$-$C_4$ alkyl group, or a bond to a silicon atom of another monomer and $Z^2$ represents a hydroxyl group, a $C_1$-$C_4$ alkoxy group, a $C_1$-$C_6$ alkyl group, or an oxygen atom bonded to a silicon atom of another monomer; and optionally, at least one activator. The spray-dried catalyst composition may be processed into one or more spheroid particles.

In another class of embodiments, the invention also provides for a process to produce a polyolefin polymer comprising: contacting under polymerizable conditions, preferably, in the gas phase or slurry phase, one or more olefin monomers with olefin polymerization catalysts as described herein; and obtaining a polymer.

Other embodiments of the invention are described and claimed herein and are apparent by the following disclosure.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

In certain aspects, the present disclosure is directed to catalyst compositions. The catalyst compositions according to certain aspects of the present invention(s) are suitable for use in polyolefin polymerization processes.

The catalyst composition may comprise (i) a support comprising an organosilica material; (ii) one or more catalyst metals or compounds; and (iii) an activator, for example, comprising alumoxane or a non-coordinating anion. The organosilica material may be a polymer of at least one monomer of Formula $[Z^1OZ^2SiCH_2]_3$, where $Z^1$ represents a hydrogen atom, a $C_1$-$C_4$ alkyl group, or a bond to a silicon atom of another monomer and $Z^2$ represents a hydroxyl group, a $C_1$-$C_4$ alkoxy group, a $C_1$-$C_6$ alkyl group or an oxygen atom bonded to a silicon atom of another monomer. Several olefin polymerization catalysts are suitable for use in several classes of embodiments as further described below.

Definitions

For purposes of this invention and the claims hereto, the numbering scheme for the Periodic Table Groups is according to the IUPAC Periodic Table of Elements.

As used herein, "olefin polymerization catalyst(s) refers to any catalyst, typically an organometallic complex or compound that is capable of coordination polymerization addition where successive monomers are added in a monomer chain at the organometallic active center.

The terms "substituent," "radical," "group," and "moiety" may be used interchangeably.

As used herein, and unless otherwise specified, the term "$C_n$" means hydrocarbon(s) having n carbon atom(s) per molecule, wherein n is a positive integer.

As used herein, and unless otherwise specified, the term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n.

The terms "hydrocarbyl radical," "hydrocarbyl," "hydrocarbyl group," "alkyl radical," and "alkyl" are used interchangeably throughout this document. Likewise, the terms "group," "radical," and "substituent," are also used interchangeably in this document. For purposes of this disclosure, "hydrocarbyl radical" is defined to be $C_1$-$C_{100}$ radicals, that may be linear, branched, or cyclic, and when cyclic, aromatic or non-aromatic. Examples of such radicals include, but are not limited to, methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like including their substituted analogues. Substituted hydrocarbyl radicals are radicals in which at least one hydrogen atom of the hydrocarbyl radical has been substituted with at least one heteroatom or heteroatom containing group, such as halogen (such as Br, Cl, F or I) or at least one functional group such as $NR^*_2$, $OR^*$, $SeR^*$, $TeR^*$, $PR^*_2$, $AsR^*_2$, $SbR^*_2$, $SR^*$, $BR^*_2$, $SiR^*_3$, $GeR^*_3$, $SnR^*_3$, $PbR^*_3$, and the like, or where at least one heteroatom has been inserted within a hydrocarbyl ring.

As used herein, and unless otherwise specified, the term "alkyl" refers to a saturated hydrocarbon radical having from 1 to 12 carbon atoms (i.e., $C_1$-$C_{12}$ alkyl), particularly from 1 to 8 carbon atoms (i.e., $C_1$-$C_8$ alkyl), particularly from 1 to 6 carbon atoms (i.e., $C_1$-$C_6$ alkyl), and particularly from 1 to 4 carbon atoms (i.e., $C_1$-$C_4$ alkyl). Examples of alkyl groups include, but are not limited to, methyl, ethyl, propyl, butyl, pentyl, hexyl, heptyl, octyl, decyl, and so forth. The alkyl group may be linear, branched or cyclic. "Alkyl" is intended to embrace all structural isomeric forms of an alkyl group. For example, as used herein, propyl encompasses both n-propyl and isopropyl; butyl encompasses n-butyl, sec-butyl, isobutyl and tert-butyl and so forth. As used herein, "$C_1$ alkyl" refers to methyl (—$CH_3$), "$C_2$ alkyl" refers to ethyl (—$CH_2CH_3$), "$C_3$ alkyl" refers to propyl (—$CH_2CH_2CH_3$) and "$C_4$ alkyl" refers to butyl (e.g., —$CH_2CH_2CH_2CH_3$, —$(CH_3)CHCH_2CH_3$, —$CH_2CH(CH_3)_2$, etc.). Further, as used herein, "Me" refers to methyl, and "Et" refers to ethyl, "i-Pr" refers to isopropyl, "t-Bu" refers to tert-butyl, and "Np" refers to neopentyl.

As used herein, and unless otherwise specified, the term "alkylene" refers to a divalent alkyl moiety containing 1 to 12 carbon atoms (i.e., $C_1$-$C_{12}$ alkylene) in length and meaning the alkylene moiety is attached to the rest of the molecule at both ends of the alkyl unit. For example, alkylenes include, but are not limited to, —$CH_2$—, —$CH_2CH_2$—, —$CH(CH_3)CH_2$—, —$CH_2CH_2CH_2$—, etc. The alkylene group may be linear or branched.

As used herein, and unless otherwise specified, the term "alkenyl" refers to an unsaturated hydrocarbon radical having from 2 to 12 carbon atoms (i.e., $C_2$-$C_{12}$ alkenyl), particularly from 2 to 8 carbon atoms (i.e., $C_2$-$C_8$ alkenyl), particularly from 2 to 6 carbon atoms (i.e., $C_2$-$C_6$ alkenyl), and having one or more (e.g., 2, 3, etc.) carbon-carbon double bonds. The alkenyl group may be linear, branched or cyclic. Examples of alkenyls include, but are not limited to ethenyl (vinyl), 2-propenyl, 3-propenyl, 1,4-pentadienyl, 1,4-butadienyl, 1-butenyl, 2-butenyl and 3-butenyl. "Alkenyl" is intended to embrace all structural isomeric forms of an alkenyl. For example, butenyl encompasses 1,4-butadienyl, 1-butenyl, 2-butenyl and 3-butenyl, etc.

As used herein, and unless otherwise specified, the term "alkenylene" refers to a divalent alkenyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —CH=CH—, —CH=CHCH$_2$—, —CH=CH=CH—, —CH$_2$CH$_2$CH=CHCH$_2$—, etc. The alkenylene group may be linear or branched.

As used herein, and unless otherwise specified, the term "alkynyl" refers to an unsaturated hydrocarbon radical having from 2 to 12 carbon atoms (i.e., $C_2$-$C_{12}$ alkynyl), particularly from 2 to 8 carbon atoms (i.e., $C_2$-$C_8$ alkynyl), particularly from 2 to 6 carbon atoms (i.e., $C_2$-$C_6$ alkynyl), and having one or more (e.g., 2, 3, etc.) carbon-carbon triple bonds. The alkynyl group may be linear, branched or cyclic. Examples of alkynyls include, but are not limited to ethynyl, 1-propynyl, 2-butynyl, and 1,3-butadiynyl. "Alkynyl" is intended to embrace all structural isomeric forms of an alkynyl. For example, butynyl encompasses 2-butynyl, and 1,3-butadiynyl and propynyl encompasses 1-propynyl and 2-propynyl (propargyl).

As used herein, and unless otherwise specified, the term "alkynylene" refers to a divalent alkynyl moiety containing 2 to about 12 carbon atoms (i.e., $C_2$-$C_{12}$ alkenylene) in length and meaning that the alkylene moiety is attached to the rest of the molecule at both ends of the alkyl unit. For example, alkenylenes include, but are not limited to, —C≡C—, —C≡CCH$_2$—, —C≡CCH$_2$C≡C—, —CH$_2$CH$_2$C≡CCH$_2$—. The alkynylene group may be linear or branched.

As used herein, and unless otherwise specified, the term "alkoxy" refers to —O— alkyl containing from 1 to about 10 carbon atoms. The alkoxy may be straight-chain or branched-chain. Non-limiting examples include methoxy, ethoxy, propoxy, butoxy, isobutoxy, tert-butoxy, pentoxy, and hexoxy. "$C_1$ alkoxy" refers to methoxy, "$C_2$ alkoxy" refers to ethoxy, "$C_3$ alkoxy" refers to propoxy and "$C_4$ alkoxy" refers to butoxy. Further, as used herein, "OMe" refers to methoxy and "OEt" refers to ethoxy.

As used herein, and unless otherwise specified, the term "aromatic" refers to unsaturated cyclic hydrocarbons having a delocalized conjugated π system and having from 5 to 20 carbon atoms (aromatic $C_5$-$C_{20}$ hydrocarbon), particularly from 5 to 12 carbon atoms (aromatic $C_5$-$C_{12}$ hydrocarbon), and particularly from 5 to 10 carbon atoms (aromatic $C_5$-$C_{12}$ hydrocarbon). Exemplary aromatics include, but are not limited to benzene, toluene, xylenes, mesitylene, ethylbenzenes, cumene, naphthalene, methylnaphthalene, dimethylnaphthalenes, ethylnaphthalenes, acenaphthalene, anthracene, phenanthrene, tetraphene, naphthacene, benzanthracenes, fluoranthrene, pyrene, chrysene, triphenylene, and the like, and combinations thereof.

Unless otherwise indicated, where isomers of a named alkyl, alkenyl, alkoxy, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

As used herein, the term "hydroxyl" refers to an —OH group.

As used herein, "oxygenate" refers to a saturated, unsaturated, or polycyclic cyclized hydrocarbon radical containing from 1 to 40 carbon atoms and further containing one or more oxygen heteroatoms.

As used herein, "aluminum alkyl adducts" refers to the reaction product of aluminum alkyls and/or alumoxanes with quenching agents, such as water and/or methanol.

As used herein, the term "mesoporous" refers to solid materials having pores that have a diameter within the range of from about 2 nm to about 50 nm.

As used herein, the term "organosilica" refers to an organosiloxane compound that comprises one or more organic groups bound to two or more Si atoms.

As used herein, the term "silanol" refers to a Si—OH group, and the term "silanol content" refers to the percent of the Si—OH groups in a compound and can be calculated by standard methods, such as NMR.

As used herein, the terms "structure directing agent," "SDA," and/or "porogen" refer to one or more compounds added to the synthesis media to aid in and/or guide the polymerization and/or polycondensing and/or organization of the building blocks that form the organosilica material framework. Further, a "porogen" is understood to be a compound capable of forming voids or pores in the resultant organosilica material framework. As used herein, the term "structure directing agent" encompasses and is synonymous and interchangeable with the terms "templating agent" and "template."

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

A "polymer" has two or more of the same or different mer units. A "homopolymer" is a polymer having mer units that are the same. A "copolymer" is a polymer having two or more mer units that are distinct or different from each other. A "terpolymer" is a polymer having three mer units that are distinct or different from each other. "Distinct" or "different" as used to refer to mer units indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mole % ethylene derived units, a "propylene polymer" or "propylene copolymer" is a polymer or copolymer comprising at least 50 mole % propylene derived units, and so on.

The term "continuous" means a system that operates without interruption or cessation. For example a continuous process to produce a polymer would be one where the reactants are continually introduced into one or more reactors and polymer product is continually withdrawn.

A "solution polymerization" means a polymerization process in which the polymer is dissolved in a liquid polymerization medium, such as an inert solvent or monomer(s) or their blends. A solution polymerization is typically homogeneous. A homogeneous polymerization is one where the polymer product is dissolved in the polymerization medium. Such systems are preferably not turbid as described in J. Vladimir Oliveira, C. Dariva and J. C. Pinto, Ind. Eng. Chem. Res. 29, 2000, 4627.

A "bulk polymerization" means a polymerization process in which the monomers and/or comonomers being polymerized are used as a solvent or diluent using little or no inert solvent as a solvent or diluent. A small fraction of inert solvent might be used as a carrier for catalyst and scavenger. A bulk polymerization system contains less than 25 wt % of inert solvent or diluent, preferably less than 10 wt %, preferably less than 1 wt %, preferably 0 wt %.

A "catalyst composition" or "catalyst system" is the combination of at least one catalyst compound, an organosilica support material, an optional activator, and an optional co-activator. A "spray-dried catalyst composition" is a catalyst composition that had undergone a spray-drying process as described herein. For the purposes of this invention and the claims thereto, when catalyst systems or compositions are described as comprising neutral stable forms of the components, it is well understood by one of ordinary skill in the art, that the ionic form of the component is the form that reacts with the monomers to produce polymers. When it is used to describe such after activation, it means the support, the activated complex, and the activator or other charge-balancing moiety. The transition metal compound may be neutral as in a precatalyst, or a charged species with a counter ion as in an activated catalyst system.

Coordination polymerization is an addition polymerization in which successive monomers are added to the organometallic active center.

The terms "cocatalyst" and "activator" are used herein interchangeably and are defined to be any compound which can activate any one of the catalyst compounds herein by converting the neutral catalyst compound to a catalytically active catalyst compound cation.

Olefin Polymerization Catalysts
Metallocene Catalysts

Useful olefin polymerization catalysts include metallocene catalyst compounds represented by the formula (VII):

$$T_y Cp_m M^6 G_n X^5{}_q \qquad (VII),$$

wherein each Cp is, independently, a cyclopentadienyl group (such as cyclopentadiene, indene or fluorene) which may be substituted or unsubstituted, $M^6$ is a Group 4 transition metal, for example, titanium, zirconium, hafnium, G is a heteroatom group represented by the formula $JR^*{}_z$ where J is N, P, O or S, and $R^*$ is a $C_1$ to $C_{20}$ hydrocarbyl group and z is 1 or 2, T is a bridging group, and y is 0 or 1, $X^5$ is a leaving group (such as a halide, a hydride, an alkyl group, an alkenyl group or an arylalkyl group), and m=1 or 2, n=0, 1, 2 or 3, q=0, 1, 2 or 3, and the sum of m+n+q is equal to the oxidation state of the transition metal. See, for example, WO 2016/094843.

In an embodiment, each Cp is a cyclopentadiene, indene or fluorene, which may be substituted or unsubstituted, and each $M^6$ is titanium, zirconium, or hafnium, and each $X^5$ is, independently, a halide, a hydride, an alkyl group, an alkenyl group or an arylalkyl group. In any of the embodiments described herein, y may be 1, m may be one, n may be 1, J may be N, and $R^*$ may be methyl, ethyl, propyl, butyl, pentyl, hexyl, heptyl, octyl, nonyl, cyclooctyl, cyclododecyl, decyl, undecyl, dodecyl, adamantyl or an isomer thereof.

In another embodiment, the one or more olefin polymerization catalysts may comprise one or more metallocene catalysts of: dimethylsilyl (tetramethylcyclopentadienyl)(cyclododecylamido)titanium dimethyl; dimethylsilyl (tetramethylcyclopentadienyl)(cyclododecylamido)titanium dichloride; dimethylsilyl (tetramethylcyclopentadienyl)(t-butylamido)titanium dimethyl; dimethylsilyl (tetramethylcyclopentadienyl)(t-butylamido)titanium dichloride; μ-$(CH_3)_2$Si(cyclopentadienyl)(1-adamantylamido)$M^7$$(R^{15})_2$; μ-$(CH_3)_2$Si(3-tertbutylcyclopentadienyl)(1-adamantylamido)$M^7(R^{15})_2$; μ-$(CH_3)_2$(tetramethylcyclopentadienyl)(1-adamantylamido)$M^7(R^{15})_2$; μ-$(CH_3)_2$Si(tetramethylcyclopentadienyl)(1-adamantylamido)$M^7(R^{15})_2$; μ-$(CH_3)_2$C(tetramethylcyclopentadienyl)(1-adamantylamido)$M^7(R^{15})_2$; μ-$(CH_3)_2$Si(tetramethylcyclopentadienyl)(1-tertbutylamido)$M^7(R^{15})_2$; μ-$(CH_3)_2$Si(fluorenyl)(1-tertbutylamido)$M^7(R^{15})_2$; μ-$(CH_3)_2$Si(tetramethylcyclopentadienyl)(1-cyclododecylamido)$M^7(R^{15})_2$; or μ-$(C_6H_5)_2$C(tetramethylcyclopentadienyl)(1-cyclododecylamido)$M^7$$(R^{15})_2$; where $M^7$ is selected from a group consisting of Ti, Zr, and Hf and $R^{15}$ is selected from halogen or $C_1$-$C_5$ alkyl.

In yet another embodiment, the one or more olefin polymerization catalysts may comprise one or more metallocene catalysts of: bis(tetrahydroindenyl)Hf $Me_2$; bis(1-butyl,3-methylcyclopentadienyl)$ZrCl_2$; bis-(n-butylcyclopentadienyl)$ZrCl_2$; $(dimethylsilyl)_2$O bis(indenyl)$ZrCl_2$; dimethylsilyl(3-(3-methylbutyl)cyclopentadienyl)(2,3,4,5-tetramethylcyclopentadienyl)$ZrCl_2$; dimethylsilylbis(tetrahydroindenyl)$ZrCl_2$; dimethylsilyl-(3-phenyl-indenyl)(tetramethylcyclopentadienyl)$ZrCl_2$; dimethylsilyl(3-neopentylcyclopentadienyl)(tetramethylcyclopentadienyl)$HfCl_2$; tetramethyldisilylene bis(4-(3,5-di-tert-butylphenyl)-indenyl)$ZrCl_2$; cyclopentadienyl(1,3-diphenylcyclopentadienyl)$ZrCl_2$; bis(cyclopentadienyl)zirconium dichloride; bis(pentamethylcyclopentadienyl)zirconium dichloride; bis(pentamethylcyclopentadienyl)zirconium dimethyl; is(pentamethylcyclopentadienyl)hafnium dichloride; bis(pentamethylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-n-butylcyclopentadienyl)hafnium dichloride; bis(1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride; bis(tetrahydro-1-indenyl)zirconium dimethyl; dimethylsilylbis(tetrahydroindenyl)zirconium dichloride; dimethylsilylbis(tetrahydroindenyl)zirconium dimethyl; dimethylsilylbis(indenyl)zirconium dichloride; dimethylsilylyl(bisindenyl)zirconium dimethyl; dimethylsilylbis(cyclopentadienyl)zirconium dichloride; or dimethylsilylbis(cyclopentadienyl)zirconium dimethyl.

In another embodiment, the one or more olefin polymerization catalyst compounds may comprise a first metallocene catalyst and a second metallocene catalyst independently selected from the group consisting of: $SiMe_2(Me_4Cp)(cC_{12}N)TiMe_2$ and bis(1-Bu,3-Me-Cp) $ZrCl_2$; $SiMe_2(Me_4Cp)(cC_{12}N)TiMe_2$ and $(SiMe_2)$ bis(indenyl)$ZrCl_2$; $SiMe_2(Me_4Cp)(cC_{12}N)TiMe_2$ and $(SiMe_2)_2$O bis(indenyl) $ZrCl_2$; $SiMe_2(Me_4Cp)(cC_{12}N)TiMe_2$ and $(SiMe_2)_2$O bis(indenyl)$ZrMe_2$; $SiMe_2(Me_4Cp)(cC_{12}N)TiMe_2$ and $SiMe_2$(3-neopentylCp)$((Me_4Cp)HfCl_2$; $SiMe_2(Me_4Cp)(cC_{12}N)TiMe_2$ and $SiMe_2$(3-neopentylcyclopentadienyl)$(Me_4Cp)HfMe_2$; $SiMe_2(Me_4Cp)$(1-adamantylamido)$TiMe_2$ and bis(1-Bu,3-MeCp)$ZrCl_2$; and $SiMe_2(Me_4Cp)$(1-t-butylamido)$TiMe_2$ and bis(1-Bu,3-MeCp)$ZrCl_2$.

Catalyst Compounds Comprising Nitrogen Linkages

Useful olefin polymerization catalysts also include:

(A) a compound represented by the Formula (VIII):

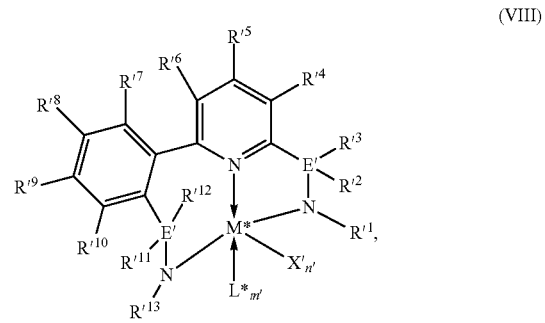

(VIII)

wherein:
$M^*$ is a Group 4 metal;
each E' group is independently selected from carbon, silicon, or germanium;
each X' is an anionic leaving group;
$L^*$ is a neutral Lewis base;
$R'^1$ and $R'^{13}$ are independently selected from the group consisting of hydrocarbyls, substituted hydrocarbyls, and silyl groups;
$R'^2$, $R'^3$, $R'^4$, $R'^5$, $R'^6$, $R'^7$, $R'^8$, $R'^9$, $R'^{10}$, $R'^{11}$, and $R'^{12}$ are independently selected from the group consisting of hydrogen, hydrocarbyls, alkoxy, silyl, amino, aryloxy, substituted hydrocarbyls, halogen, and phosphino;
n' is 1 or 2;
m' is 0, 1, or 2; and
two X' groups may be joined together to form a dianionic group;
two $L^*$ groups may be joined together to form a bidentate Lewis base;
an X' group may be joined to an $L^*$ group to form a monoanionic bidentate group;
$R'^7$ and $R'^8$ may be joined to form a ring; and
$R'^{10}$ and $R'^{11}$ may be joined to form a ring;

(B) a compound represented by the Formula (IX):

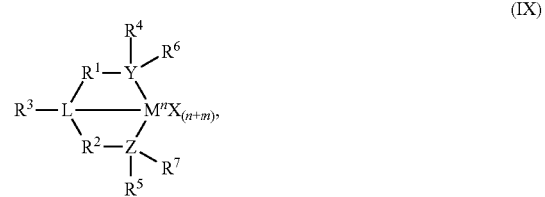

(IX)

wherein:
M is a Group 3-12 transition metal or a Group 13 or 14 main group metal;
each X is independently an anionic leaving group;
n is the formal oxidation state of M;
m is the formal charge of the ligand comprising Y, Z, and L;
Y is a Group 15 element;
Z is a Group 15 element;
$R^1$ and $R^2$ are independently a $C_1$ to $C_{20}$ hydrocarbon group, a heteroatom-containing group having up to twenty carbon atoms, silicon, germanium, tin, lead, phosphorus, or a halogen, where $R^1$ and $R^2$ may also be interconnected to each other;

$R^3$ is absent or a hydrocarbon group, hydrogen, a halogen, or a heteroatom-containing group;

$R^4$ and $R^5$ are independently an aryl group, a substituted aryl group, a cyclic alkyl group, a substituted cyclic alkyl group, a cyclic aralkyl group, a substituted cyclic aralkyl group or multiple ring system; and $R^6$ and $R^7$ are independently absent, or hydrogen, halogen, heteroatom or a hydrocarbyl group; or (C) a compound represented by the Formula (X).

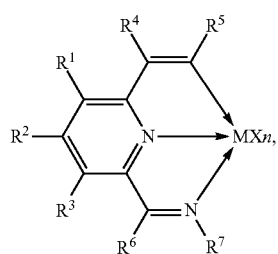

(X)

wherein:

M comprises a transition metal from Group 7, 8 or 9 of the Periodic Table of Elements;

X is an atom or group covalently or ionically bonded to the transition metal M;

n is 1, 2, 3, 4, or 5; and $R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more can be linked to form one or more cyclic substituents; and combinations thereof. See, for example, WO 2016/094870.

In an embodiment, one or more olefin polymerization catalyst compounds comprise a catalyst compound of the Formula (VIII), wherein M* is hafnium, each E' group is carbon, each X' is an alkyl, aryl, hydride, alkylsilane, fluoride, chloride, bromide, iodide, triflate, carboxylate, or alkylsulfonate, each L* is a an ether, amine, or thioether, each $R^1$ and $R^{13}$ is an aryl group, each $R^7$ and $R^8$ is joined to form a six-membered aromatic ring with the joined $R^7$ and $R^8$ group being —CH=CHCH=CH—, and $R^{10}$ and $R^{11}$ may be a five-membered ring with the joined $R'^{10}R'^{11}$ group being —CH$_2$CH$_2$— or a six-membered ring with the joined $R^{10}R^{11}$ group being —CH$_2$CH$_2$CH$_2$—.

In another embodiment, the one or more olefin polymerization catalyst compounds comprise a catalyst compound of the Formula (IX), wherein M is zirconium or hafnium, n is +3, +4, or +5, m is 0, −1, −2 or −3, L is nitrogen; Y is nitrogen or phosphorus, Z is nitrogen or phosphorus, $R^1$ and $R^2$ are a $C_2$ to $C_{20}$ alkyl, aryl or aralkyl group, $R^3$ is absent, a linear, cyclic or branched alkyl $C_1$ to $C_{20}$ group, or hydrogen, $R^4$ and $R^5$ independently are a $C_1$ to $C_{20}$ hydrocarbon group, a $C_1$ to $C_{20}$ aryl group or a $C_1$ to $C_{20}$ aralkyl group, and $R^6$ and $R^7$ are independently a linear, cyclic or branched $C_2$ to $C_{20}$ alkyl group or absent.

In yet another embodiment, the one or more olefin polymerization catalyst compounds comprise a catalyst compound of the Formula (X) and n is 2 or 3.

Phenoxide Transition Metal Compounds

Useful olefin polymerization catalysts also include:
a compound represented by the Formula (XI):

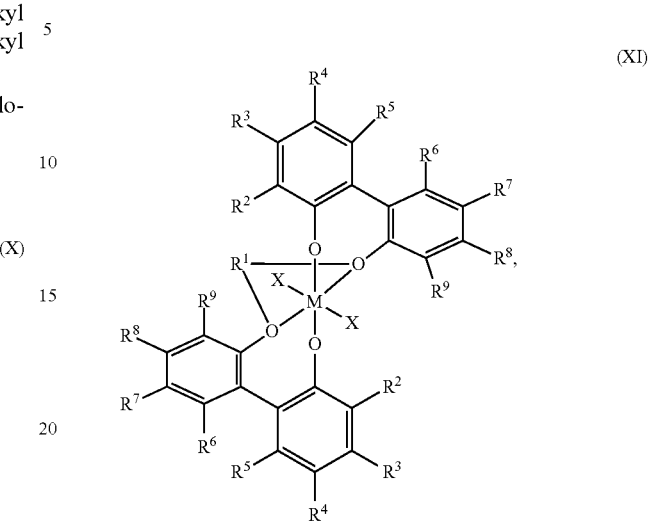

(XI)

wherein:

M is selected from the group consisting of Ti, Zr, and Hf;

each $R^1$ through $R^9$ may be independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is at least one leaving group. See, for example, WO 2016/094861.

Catalyst Compounds Comprising at Least One Nitrogen Linkage and at Least One Oxygen Linkage to a Transition Metal Additionally, useful olefin polymerization catalysts include:

(A) a compound represented by the Formula (XII):

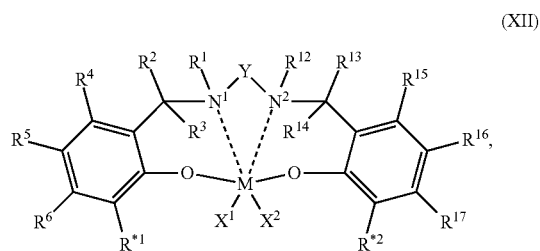

(XII)

wherein: each solid line represents a covalent bond and each dashed line represents a coordinative link; wherein M is a Group 3, 4, 5, or 6 transition metal; $N^1$ and $N^2$ are nitrogen; O is oxygen; each of $X^1$ and $X^2$ is, independently, a univalent $C_1$ to $C_{20}$ hydrocarbyl radical, a functional group comprising elements from Groups 13 to 17, or $X^1$ and $X^2$ join together to form a $C_4$ to $C_{62}$ cyclic or polycyclic ring structure, provided however when M is trivalent $X^2$ is not present; each $R^1$, $R^2$, $R^3$, $R^4$, $R^5$, $R^6$, $R^{12}$, $R^{13}$, $R^{14}$, $R^{15}$, $R^{16}$, and $R^{17}$ is, independently, hydrogen, a $C_1$ to $C_{40}$ hydrocarbyl radical, a $C_1$ to $C_{40}$ substituted hydrocarbyl radical, two or more of $R^1$, $R^2$, $R^3$, $R^4$, $R^5$, $R^6$, $R^{12}$, $R^{13}$, $R^{14}$, $R^{15}$, $R^{16}$, and $R^{17}$ independently join together to form a $C_4$ to $C_{62}$ cyclic or polycyclic ring structure, or a combination thereof; wherein $R^{*1}$ and $R^{*2}$ independently comprise a bulky functional group, an electron withdrawing group, or a combination thereof; and Y is a divalent $C_1$ to $C_{20}$ hydrocarbyl radical;

(B) a compound represented by the Formula (XIII):

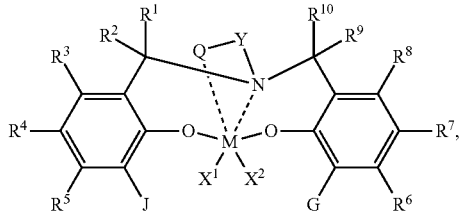

(XIII)

wherein:

M is a Group 4 transition metal; $X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure; each $R^1$, $R^2$, $R^3$, $R^4$, $R^5$, $R^6$, $R^7$, $R^8$, $R^9$, and $R^{10}$ is independently a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof; and Q is a neutral donor group;

J is a $C_7$ to $C_{60}$ fused polycyclic group, which optionally comprises up to 20 atoms from Groups 15 and 16, where at least one ring is aromatic and where at least one ring, which may or may not be aromatic, has at least five members; G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof; or (C) a compound represented by the Formula (XIV).

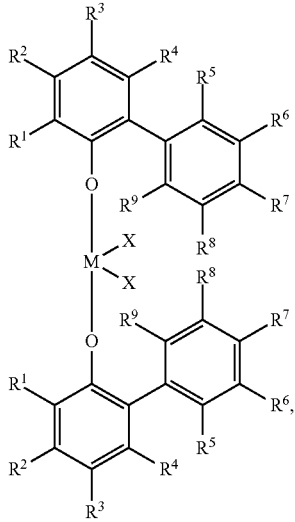

(XIV)

wherein:

M is selected from the group consisting of Ti, Zr, and Hf; at least one of $R^1$ through $R^9$ is substituted with a moiety having the following structure (XV):

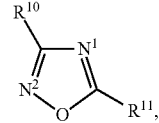

(XV)

where structure (XV) is attached at any one of $R^1$ through $R^9$ at the $R^{10}$ or $R^{11}$ position; at least one of nitrogen $N^1$ or $N^2$ of Structure (XV) forms a dative bond with metal M; and each of $R^1$ through $R^{11}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; X is a leaving group; and combinations thereof.

In an embodiment, the one or more olefin polymerization catalyst compounds comprise a catalyst compound of the Formula (XII), wherein $X^1$ and $X^2$ are benzyl radicals and Y is selected from the group consisting of —$CH_2CH_2$—, 1,2-cyclohexylene, and —$CH_2CH_2CH_2$—.

In another embodiment, the one or more olefin polymerization catalyst compounds comprise a catalyst compound of Formula (XII), wherein $R^{*1}$ and $R^{*2}$ each comprises a cyclopentadienyl radical having a structure according to the Formula:

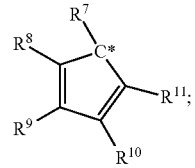

(XVI)

wherein:

C* indicates an attachment carbon of the radical;

$R^7$ is a $C_1$ to $C_{40}$ hydrocarbyl radical or a substituted $C_1$ to $C_{40}$ hydrocarbyl radical; and each of $R^8$, $R^9$, $R^{10}$, and $R^{11}$ is, independently, a hydrogen, a $C_1$ to $C_{40}$ hydrocarbyl radical, a substituted $C_1$ to $C_{40}$ hydrocarbyl radical, two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, and $R^{17}$ from Formula (XII) independently join together to form a $C_4$ to $C_{62}$ cyclic or polycyclic ring structure, or a combination thereof.

In yet another embodiment, the one or more olefin polymerization catalyst compounds comprise a catalyst compound of Formula (XIII), wherein the complex is represented by the Formulas (XVII) or (XIII):

(XVII)

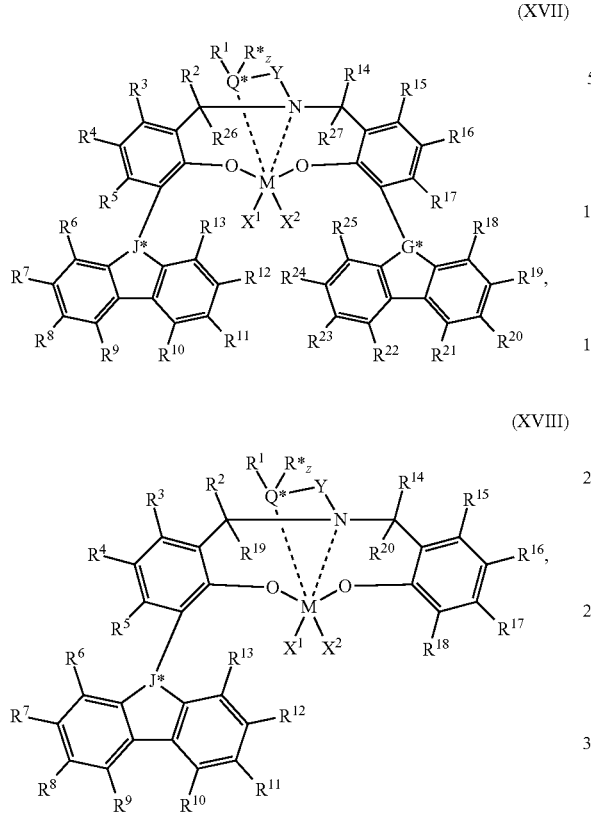

(XVIII)

wherein:

M is Hf, Zr, or Ti; $X^1$, $X^2$, $R^1$, $R^2$, $R^3$, $R^4$, $R^5$, $R^6$, $R^7$, $R^8$, $R^9$, $R^{10}$, and Y are as defined in claim 1; each $R^*$, $R''$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a hydrogen, a $C_1$ to $C_{40}$ hydrocarbyl radical, a $C_1$ to $C_{40}$ substituted hydrocarbyl radical, a functional group comprising elements from Groups 13 to 17, or two or more of $R^1$ to $R^{28}$ may independently join together to form a $C_4$ to $C_{62}$ cyclic or polycyclic ring structure, or a combination thereof, or R1 and R* may independently join together to form a five- to eight-membered heterocycle; $Q^*$ is a group 15 or 16 atom; z is 0 or 1; $J^*$ is CR'' or N; and $G^*$ is CR'' or N.

In still another embodiment, the one or more olefin polymerization catalyst compounds comprise a catalyst compound of Formula (XIII), wherein the catalyst complex is represented by the Formulas (XIX) or (XX):

(XIX)

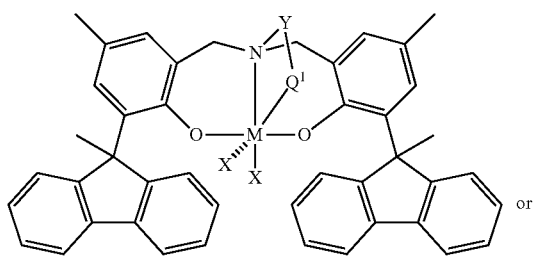

or (XX)

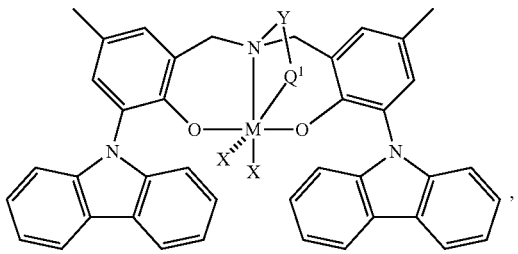

where Y is a divalent $C_1$ to $C_3$ hydrocarbyl, $Q^1$ is $NR'_2$, $OR'$, $SR'$, $PR'_2$, where R' is as defined for $R^1$ in claim 1, M is Zr, Hf, or Ti and each X is, independently, as defined for $X^1$ in claim 1.

In an embodiment, the one or more olefin polymerization catalyst compounds comprise a catalyst compound of the Formula (XIV), wherein the catalyst complex is represented by the Formula (XXI):

(XXI)

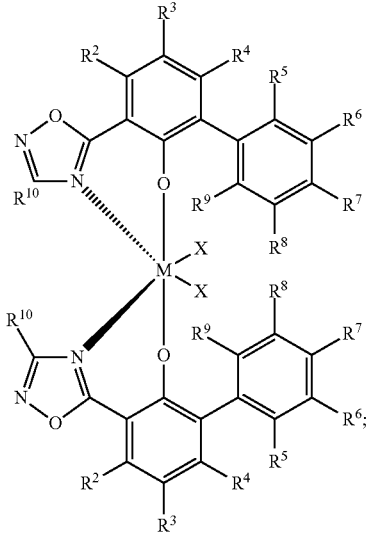

where M is selected from the group consisting of Ti, Zr, and Hf;

each of $R^2$ through $R^{10}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is at least one leaving group.

Organosilica Materials

In certain aspects, the invention relates to organosilica materials used as catalyst support materials. The organosilica material supports may be a polymer formed of at least one monomer, as will be described further detail below. In certain embodiments, the organosilica material may be a polymer formed of multiple distinct monomers. Methods and materials for producing the organosilica materials as well as characterization description may be found in, for example, WO 2016/094770 and WO 2016 094774.

Monomers of Formula (I)

In a first embodiment, the organosilica material supports may be a polymer of at least one monomer of Formula $[Z^1OZ^2SiCH_2]_3$ (I), where $Z^1$ represents a hydrogen atom, a $C_1$-$C_4$ alkyl group, or a bond to a silicon atom of another monomer and $Z^2$ represents a hydroxyl group, a $C_1$-$C_4$ alkoxy group, a $C_1$-$C_6$ alkyl group, or an oxygen atom bonded to a silicon atom of another monomer.

As used herein, and unless otherwise specified, "a bond to a silicon atom of another monomer" means the bond can advantageously displace a moiety (particularly an oxygen-containing moiety such as a hydroxyl, an alkoxy or the like), if present, on a silicon atom of another monomer so there may be a bond directly to the silicon atom of the another monomer thereby connecting the two monomers, e.g., via a Si—O—Si linkage. As used herein, and unless otherwise specified, "an oxygen atom bonded to a silicon atom of another monomer" means that the oxygen atom can advantageously displace a moiety (particularly an oxygen-containing moiety such as a hydroxyl), if present, on a silicon atom of the another monomer so the oxygen atom may be bonded directly to the silicon atom of the another monomer thereby connecting the two monomers, e.g., via a Si—O—Si linkage. For clarity, in the aforementioned bonding scenarios, the "another monomer" can be a monomer of the same type or a monomer of a different type.

In various embodiments, each $Z^1$ can be a hydrogen atom. Each $Z^1$ can be a $C_1$-$C_4$ alkyl group, a $C_1$-$C_3$ alkyl group, a $C_1$-$C_2$ alkyl group, or methyl. Each $Z^1$ can be bonded to a silicon atom of another monomer. Each $Z^1$ can be a hydrogen atom, a $C_1$-$C_2$ alkyl group, or a bond to a silicon atom of another monomer. Each $Z^2$ can be a hydroxyl group. Each $Z^2$ can be a $C_1$-$C_6$ alkyl group, a $C_1$-$C_5$ alkyl group, a $C_1$-$C_4$ alkyl group, a $C_1$-$C_3$ alkyl group, a $C_1$-$C_2$ alkyl group, or methyl. Each $Z^2$ can be a $C_1$-$C_4$ alkoxy group, a $C_1$-$C_3$ alkoxy group, a $C_1$-$C_2$ alkoxy group, or methoxy. Each $Z^2$ can be an oxygen atom bonded to a silicon atom of another monomer. Each $Z^2$ can be a hydroxyl group, a $C_1$-$C_4$ alkoxy group, or an oxygen atom bonded to a silicon atom of another monomer. Each $Z^2$ can be a hydroxyl group, a $C_1$-$C_2$ alkyl group (methyl or ethyl), a $C_1$-$C_2$ alkoxy group (methoxy or ethoxy), or an oxygen atom bonded to a silicon atom of another monomer. Each $Z^1$ can be a hydrogen atom, a $C_1$-$C_2$ alkyl group, or a bond to a silicon atom of another monomer and $Z^2$ can be a hydroxyl group, a $C_1$-$C_2$ alkyl group, a $C_1$-$C_2$ alkoxy group, or an oxygen atom bonded to a silicon atom of another monomer. In another embodiment, each $Z^1$ can be a hydrogen atom, ethyl or a bond to a silicon atom of another monomer and each $Z^2$ can be a hydroxyl group, ethoxy, or an oxygen atom bonded to a silicon atom of another monomer. In another embodiment, each $Z^1$ can be a hydrogen atom, ethyl or a bond to a silicon atom of another monomer and each $Z^2$ can be methyl.

In certain variations, the organosilica material may be a polymer of at least one monomer of Formula (I) and also further comprises at least one additional monomer of Formula (I). For example, the polymer may comprise a first monomer of Formula (I), as well as a second distinct monomer of Formula (I).

In a particular embodiment, the polymer may comprise a first monomer of Formula (I), wherein each $Z^1$ can be a hydrogen atom, ethyl or a bond to a silicon atom of another monomer and each $Z^2$ can be a hydroxyl group, ethoxy, or an oxygen atom bonded to a silicon atom of another monomer; and second distinct monomer of Formula (I), wherein each $Z^1$ can be a hydrogen atom, ethyl or a bond to a silicon atom of another monomer and each $Z^2$ can be methyl.

Monomers of Formula (II)

In certain other aspects, the organosilica material support may be a polymer formed of multiple distinct monomers, including a monomer of Formula I in combination with one or more additional monomers.

In a second embodiment, the organosilica material support may be a polymer of at least one monomer of Formula (I) and a monomer of Formula $Z^3OZ^4Z^5Z^6Si$ (II), where $Z^3$ independently represents a hydrogen atom or a $C_1$-$C_4$ alkyl group, or a bond to a silicon atom of another monomer; and each of $Z^4$, $Z^5$ and $Z^6$ are independently selected from the group consisting of a hydroxyl group, a $C_1$-$C_4$ alkyl group (preferably methyl, ethyl, propyl, or butyl), and a $C_1$-$C_4$ alkoxy group (preferably methoxy, ethoxy, proposy or butoxy).

In various aspects, each $Z^3$ can be a $C_1$-$C_3$ alkyl group, a $C_1$-$C_2$ alkyl group (preferably ethyl, methyl, propyl, butyl) or a bond to a silicon atom of another monomer, and/or each $Z^4$, $Z^5$ and $Z^6$ each independently can be a hydroxyl group. Alternately each $Z^3$ can be a hydrogen atom, a $C_1$-$C_2$ alkyl group, or a bond to a silicon atom of another monomer and $Z^4$, $Z^5$ and $Z^6$ each independently can be a hydroxyl group or a $C_1$-$C_2$ alkyl group.

Each $Z^4$, $Z^5$ and $Z^6$ independently can be a $C_1$-$C_4$ alkyl group, a $C_1$-$C_3$ alkyl group, a $C_1$-$C_2$ alkyl group, or methyl, preferably a hydroxyl group, or a $C_1$-$C_2$ alkyl group, alternately each $Z^4$, $Z^5$ and $Z^6$ independently can be a $C_1$-$C_4$ alkoxy group, a $C_1$-$C_3$ alkoxy group, a $C_1$-$C_2$ alkoxy group, or methoxy, preferably each $Z^4$, $Z^5$ and $Z^6$ is independently can be selected from the group consisting of a hydroxyl group, a $C_1$-$C_2$ alkyl group and a $C_1$-$C_2$ alkoxy group.

Alternately, each $Z^3$ can be a hydrogen atom, a $C_1$-$C_2$ alkyl group, or a bond to a silicon atom of another monomer; and $Z^4$, $Z^5$ and $Z^6$ each independently can be selected from the group consisting of a hydroxyl group, a $C_1$-$C_2$ alkyl group and a $C_1$-$C_2$ alkoxy group.

In a particular embodiment, each $Z^3$ can be a hydrogen atom, ethyl or a bond to a silicon atom of another monomer; and $Z^4$, $Z^5$ and $Z^6$ each independently can be selected from the group consisting of a hydroxyl group, ethoxy, and an oxygen atom bonded to a silicon atom of another monomer.

In another particular embodiment, each $Z^3$ can be a hydrogen atom, ethyl or a bond to a silicon atom of another comonomer; $Z^4$ and $Z^5$ each independently can be selected from the group consisting of a hydroxyl group, ethoxy, and an oxygen atom bonded to a silicon atom of another monomer; and $Z^6$ can be methyl.

In another particular embodiment, each $Z^3$ can be a hydrogen atom, methyl or a bond to a silicon atom of another comonomer; $Z^4$ and $Z^5$ each independently can be selected from the group consisting of a hydroxyl group, methoxy, and an oxygen atom bonded to a silicon atom of another monomer.

Monomers of Formula (III)

In a third embodiment, the organosilica material support may be a polymer of at least one monomer of Formula (I) and a monomer having at least one unit of Formula:

$Z^7Z^8Z^9Si$—$R^1$—$SiZ^7Z^8Z^9$ (III), where each $Z^7$ independently represents a hydroxyl group, a $C_1$-$C_4$ alkoxy group, or an oxygen atom bonded to a silicon atom of another comonomer; each of $Z^8$ and $Z^9$ independently represent a hydroxyl group, a $C_1$-$C_4$ alkoxy group, a $C_1$-$C_4$ alkyl group, or an oxygen bonded to a silicon atom of another monomer;

and $R^1$ is selected from the group consisting of a $C_1$-$C_8$ alkylene group, a $C_2$-$C_8$ alkenylene group, and a $C_2$-$C_8$ alkynylene group.

In various aspects, each $Z^7$ can be a hydroxyl group or a $C_1$-$C_4$ alkoxy group, a $C_1$-$C_3$ alkoxy group, a $C_1$-$C_2$ alkoxy group, or methoxy, preferably a hydroxyl group, or a $C_1$-$C_2$ alkoxy group or oxygen atom bonded to a silicon atom of another comonomer. Each $Z^8$ and $Z^9$ can independently be a hydroxyl group a $C_1$-$C_4$ alkoxy group, a $C_1$-$C_3$ alkoxy group, a $C_1$-$C_2$ alkoxy group, or methoxy, a $C_1$-$C_4$ alkyl group, a $C_1$-$C_3$ alkyl group, a $C_1$-$C_2$ alkyl group, or methyl. Alternatively, each $Z^8$ and $Z^9$ independently can be an oxygen atom bonded to a silicon atom of another comonomer. Each $Z^7$ can be a hydroxyl group, a $C_1$-$C_2$ alkoxy group, or an oxygen atom bonded to a silicon atom of another comonomer; and $Z^8$ and $Z^9$ each independently can be a hydroxyl group, a $C_1$-$C_2$ alkoxy group, a $C_1$-$C_2$ alkyl group, or an oxygen atom bonded to a silicon atom of another comonomer. When present with Formula (I), each $Z^7$ can be a hydroxyl group, ethoxy, methoxy or an oxygen atom bonded to a silicon atom of another comonomer; and each $Z^8$ and $Z^9$ independently can be a hydroxyl group, ethoxy, methyl, or an oxygen atom bonded to a silicon atom of another comonomer.

Each $R^1$ can be a $C_1$-$C_8$ alkylene group, a $C_1$-$C_7$ alkylene group, a $C_1$-$C_6$ alkylene group, a $C_1$-$C_5$ alkylene group, a $C_1$-$C_4$ alkylene group, a $C_1$-$C_3$ alkylene group, a $C_1$-$C_2$ alkylene group, or —CH$_2$—.

Each $R^1$ can be an optionally substituted $C_6$-$C_{20}$ aralkyl, an optionally substituted $C_6$-$C_{14}$ aralkyl, or an optionally substituted $C_6$-$C_{10}$ aralkyl. Examples of $C_6$-$C_{20}$ aralkyls include, but are not limited to, phenylmethyl, phenylethyl, and naphthylmethyl. The aralkyl may be optionally substituted with a $C_1$-$C_6$ alkyl group, particularly a $C_1$-$C_4$ alkyl group.

Each $Z^7$ can be a hydroxyl group, ethoxy, methoxy or an oxygen atom bonded to a silicon atom of another comonomer; each Z8 and Z9 independently can be a hydroxyl group, ethoxy, methoxy, methyl, or an oxygen atom bonded to a silicon atom of another comonomer; and $R^1$ can be selected from the group consisting of —CH$_2$—, —CH$_2$CH$_2$—, and —HC=CH—.

Each $Z^7$ can be a hydroxyl group, or an oxygen atom bonded to a silicon atom of another comonomer; each $Z^8$ and $Z^9$ independently can be a hydroxyl group, methyl, or an oxygen atom bonded to a silicon atom of another comonomer; and $R^1$ can be selected from the group consisting of —CH$_2$—, —CH$_2$CH$_2$—, and —HC=CH—.

In a particular embodiment, each $Z^7$ can be a hydroxyl group, ethoxy or an oxygen atom bonded to a silicon atom of another comonomer; each $Z^8$ can be a hydroxyl group, ethoxy, and an oxygen atom bonded to a silicon atom of another monomer; each $Z^9$ can be methyl; and $R^1$ can be —CH$_2$CH$_2$—.

In another particular embodiment, each $Z^7$ can be a hydroxyl group, ethoxy or an oxygen atom bonded to a silicon atom of another comonomer; each $Z^8$ and $Z^9$ independently can be selected from the group consisting of a hydroxyl group, ethoxy, and an oxygen atom bonded to a silicon atom of another monomer; and $R^1$ can be —CH$_2$— or —HC=CH—.

In another particular embodiment, each $Z^7$ can be a hydroxyl group, ethoxy or an oxygen atom bonded to a silicon atom of another comonomer; each $Z^8$ can be a hydroxyl group, ethoxy, and an oxygen atom bonded to a silicon atom of another monomer; each $Z^9$ can be methyl; and $R^1$ can be —CH$_2$— or —HC=CH—.

In various embodiments, each $Z^{13}$ can be methyl, ethyl, propyl, or butyl, preferably methyl or ethyl. Alternatively, each $Z^{14}$ and $Z^{15}$ independently can be a hydroxyl group. Each $Z^{14}$ and $Z^{15}$ independently can be methyl, ethyl, propyl, or butyl, preferably methyl or ethyl. Each $Z^{14}$ and $Z^{15}$ independently can be a $C_1$-$C_4$ alkoxy group, a $C_1$-$C_3$ alkoxy group, a $C_1$-$C_2$ alkoxy group or methoxy.

Each $Z^{13}$ can be a hydrogen atom, a $C_1$-$C_2$ alkyl group or a bond to a silicon atom of another monomer; each $Z^{14}$ and $Z^{15}$ independently can be a hydroxyl group, a $C_1$-$C_2$ alkyl group, a $C_1$-$C_2$ alkoxy group, or an oxygen atom bonded to a silicon atom of another monomer unit. Each $Z^{13}$ can be a hydrogen atom, methyl, or a bond to a silicon atom of another monomer; each $Z^{14}$ and $Z^{15}$ independently can be a hydroxyl group, methoxy or an oxygen atom bonded to a silicon atom of another monomer unit.

Activators

The catalyst compositions may be combined with activators in any manner in the art including by supporting them for use in slurry or gas phase polymerization. Activators are generally compounds that can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion.

Alumoxane Activators

Alumoxane activators are utilized as activators in the catalyst compositions described herein. Alumoxanes are generally oligomeric compounds containing —Al($R^1$)—O—sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, and preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^-]$; 1-(4-(tris(pentafluorophenyl)borate)-2,3,5,6-tetrafluorophenyl)pyrrolidinium; and tetrakis (pentafluorophenyl)borate, 4-(tris(pentafluorophenyl) borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis (perfluoronaphthyl)borate, N,N-dialkylanilinium tetrakis (perfluoronaphthyl)borate, trialkylammonium tetrakis (perfluorobiphenyl)borate, N,N-dialkylanilinium tetrakis (perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl) phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

Spray-Drying

The catalyst compositions as described above may be spray-dried by processes known in the art to produce a spray-dried catalyst composition. After the spray-drying process, the spray-dried catalyst composition may take the form of discrete particles, in particular, one or more spheroid particles as discussed below.

Preparation of the spray-dried catalyst composition may include mixing or otherwise combining the one or more catalysts, one or more activators, one or more organosilica materials, and one or more diluents to produce a suspension. The suspension can then be spray-dried to produce the spray-dried catalyst composition.

The components of the suspension may be combined in any suitable order or sequence. For example, the diluent or a portion of the diluent, the organosilica material, and the activator can be combined to produce a first mixture. The first mixture may be stirred or otherwise mixed for a period of time ranging from about 1 minute to about 24 hours. The first mixture may be mixed at a temperature ranging from room temperature (~23° C.) up to a temperature of about 40° C., about 60° C., about 80° C., or about 100° C. After mixing the first mixture the catalyst compound(s) may be combined with the first mixture to produce a second mixture. If only a portion of the diluent is combined in the first mixture, the catalyst compound(s) and the remaining diluent can first be combined and then added to the first mixture to produce the second mixture. The second mixture can be mixed for a period of time ranging from about 1 minute to about 24 hours. The second mixture may be mixed at a temperature ranging from room temperature to about 40° C., about 60° C., about 80° C., or about 100° C. The first mixture and/or the second mixture may be mixed under an inert atmosphere such as nitrogen.

The diluent(s) or solvent(s) may be or include any material capable of dissolving or suspending the catalysts and activator and suspending the organosilica materials. Illustrative diluents include, but are not limited to, linear and/or branched alkanes such as ethane, propane, butane, isobutene, pentane, isopentane, hexane, heptane, octane, decane, dodecane, hexadecane, octadecane, and the like; alicyclic hydrocarbons such as cyclopentane, methylcyclopentane, cyclohexane, cyclooctane, norbornane, ethylcyclohexane, and the like; aromatic hydrocarbons such as benzene, toluene, ethylebenzene, propylbenzene, butylbenzene, xylene, and the like; petroleum fractions such as gasoline, kerosene, light oils, and the like. Likewise, halogenated hydrocarbons such as methylene chloride, dichloromethane, chlorobenzene, and the like, may also be used. Two or more diluents may be used together.

The particular amount or concentration of the various components of the catalyst composition may vary depending, at least in part, on the particular catalyst(s), activator(s), organosilica material(s), and/or diluent(s) present therein. For example, the suspension may have a concentration of the catalysts ranging from about 0.05 wt %, about 0.09 wt %, or about 0.15 wt % to about 0.4 wt %, about 0.8 wt %, or about 1.2 wt %. In another example, the suspension may have a catalyst concentration of from about 0.13 wt % to about 0.22 wt %, about 0.14 wt % to about 0.2 wt %, or about 0.15 wt % to about 0.19 wt %. The suspension may have a concentration of the organosilica material ranging from about 1 wt %, about 3 wt % or about 5 wt % to about 10 wt %, about 15 wt %, or about 20 wt %. In another example, the suspension may have a concentration of the organosilica material of from about 3 wt % to about 8 wt %, about 4 wt % to about 7 wt %, or about 5 wt % to about 6 wt %. The suspension may have a concentration of the activator ranging from about 1 wt %, about 2 wt %, or about 3 wt % to about 6 wt %, about 8 wt %, or about 10 wt %. The suspension may have a diluent concentration ranging from about 70 wt %, about 75 wt %, or about 80 wt % to about 90 wt %, about 95 wt %, or about 98 wt %. All weight percents are based upon the total weight of the suspension.

The suspension may be atomized and introduced into a stream of heated, inert drying gas such as nitrogen, argon, propane, and the like, or any combination thereof to evaporate the diluent and produce solid-form particles. The volumetric flow of the drying gas may be greater than the volumetric flow of the suspension. The suspension may be atomized using any suitable device(s), system(s), or combination of device(s) and/or system(s). For example, the suspension may be atomized via an atomizing nozzle or a centrifugal high speed disc atomizer.

Atomization of the suspension via an atomizing nozzle may also include mixing the suspension with an atomizing gas. The temperature of the atomizing nozzle may be at or above the boiling point of the highest boiling component of the final suspension. The atomized suspension may be introduced to a drying chamber where the volatiles can dry in the presence of the heated, inert drying gas. If any spray-dried particles having an undesirably large diameter are produced, at least a portion of those over-sized particles may be separated within a collection zone of the drying chamber. Spray-dried catalyst composition particles having a desired size may be recovered from the drying chamber and can then be separated from the inert drying gas. For example, the spray-dried catalyst composition particles and the drying gas can be separated within a cyclone. Other suitable equipment and processes for preparing the spray-dried catalyst compositions are discussed and described in, for example, U.S. Pat. Nos. 4,638,029, 4,728,705, 5,290,745, 5,306,350, 5,604,172, 5,716,558, 6,458,738, 6,982,236, 7,566,677, 8,497,330, and U.S. Publication Nos. 2006/0293470 and 2007/0191215.

The spray-drying process produces discrete particles or particulates after evaporation or drying of the diluent. Thus, the spray-dried catalyst composition may be formed into one or more spheroid particles. As used herein, "spheroid particle" may refer to any ellipsoid structure. As used herein, "ellipsoid" may be described as an ellipse that has been rotated about at least one of its axis. In a class of embodiments, the spheroid particle may have two equal semi-diameters. The spheroid particle may be one or more of a prolated spheroid (elongated), oblate spheroid (flattened), and sphere itself. As used herein, "spheroid particle" may also refer to two or three dimensional ovoid particles, for example, an ovum (egg). As used herein, "particle(s)" refers to discrete units of material structure as discussed in Hawley's Condensed Chemical Dictionary, Richard J. Lewis Sr., 13th ed., 1997, John Wiley & Sons, Inc., page 840. For the sake of brevity, when spheroid particle is used it may refer to any definition as defined herein as well as refer to one or more of the spheroid particles definitions defined above. In a class of embodiments, the spheroid particles are homogeneous. However, in other classes of embodiments, the spheroid particles need not have the same morphology.

Binders

The catalyst composition may optionally comprise a "binder" or sometimes also referred to as a "filler". Suitable binders, include but are not limited to silica, alumina, zirconia, titania, silica-alumina, cerium oxide, magnesium oxide, or combinations thereof. Thus, in another embodiment, an organosilica material comprising a catalyst material described herein is provided. The catalyst material may optionally comprise a binder or be self-bound. Suitable binders, include but are not limited to, active and inactive materials, synthetic or naturally occurring zeolites, as well as inorganic materials such as clays and/or oxides such as silica, alumina, zirconia, titania, silica-alumina, cerium oxide, magnesium oxide, or combinations thereof. In particular, the binder may be silica-alumina, alumina and/or a zeolite, particularly alumina. Silica-alumina may be either naturally occurring or in the form of gelatinous precipitates or gels including mixtures of silica and metal oxides. It should be noted it is recognized herein that the use of a material in conjunction with a zeolite binder material, i.e., combined therewith or present during its synthesis, which itself is catalytically active may change the conversion and/or selectivity of the finished catalyst. It is also recognized herein that inactive materials can suitably serve as diluents to control the amount of conversion if the present invention is employed in alkylation processes so that alkylation products can be obtained economically and orderly without employing other means for controlling the rate of reaction. These inactive materials may be incorporated into naturally occurring clays, e.g., bentonite and kaolin, to improve the crush strength of the catalyst under commercial operating conditions and function as binders or matrices for the catalyst. The catalysts described herein typically can comprise, in a composited form, a ratio of support material to binder material ranging from about 80 parts support material to 20 parts binder material to 20 parts support material to 80 parts binder material, all ratios being by weight, typically from 80:20 to 50:50 support material: binder material, preferably from 65:35 to 35:65. Compositing may be done by conventional means including mulling the materials together followed by extrusion of pelletizing into the desired finished catalyst particles.

Scavengers, Chain Transfer Agents and/or Co-Activators

Scavengers, chain transfer agents, or co-activators may also be used. Aluminum alkyl compounds which may be utilized as scavengers or co-activators include, for example, one or more of those represented by the formula $AlR_3$, where each R is, independently, a $C_1$-$C_8$ aliphatic radical, preferably methyl, ethyl, propyl, butyl, pentyl, hexyl octyl or an isomer thereof), especially trimethylaluminum, triethylaluminum, triisobutylaluminum, tri-n-hexylaluminum, tri-n-octylaluminum or mixtures thereof.

Useful chain transfer agents that may also be used herein are typically a compound represented by the formula $AlR^{20}_3$, $ZnR^{20}_2$ (where each $R^{20}$ is, independently, a $C_1$-$C_8$ aliphatic radical, preferably methyl, ethyl, propyl, butyl, pentyl, hexyl octyl or an isomer thereof) or a combination thereof, such as diethyl zinc, trimethylaluminum, triisobutylaluminum, trioctylaluminum, or a combination thereof.

Polymerization Processes

In certain embodiments, the catalytic systems of the present disclosure include organosilica materials as described herein as support matrices for separation and/or catalysis processes. For example, the organosilica materials may be supports in used for a polymerization process.

In embodiments herein, the invention relates to polymerization processes where monomer (such as propylene and or ethylene), and optionally comonomer, are contacted with a catalyst system comprising an activator, an organosilica material support and at least one catalyst, such as a metallocene compound, as described above. The support, catalyst compound, and activator may be combined in any order, and are combined typically prior to contacting with the monomers.

Monomers useful herein include substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecene and isomers thereof.

In an embodiment of the invention, the monomer comprises propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

In another embodiment of the invention, the monomer comprises ethylene and optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

In a preferred embodiment one or more dienes are present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes ($M_w$ less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

Polymerization processes according to the present disclosure can be carried out in any manner known in the art. Any suspension, slurry, or gas phase polymerization process known in the art can be used under polymerizable conditions. As used herein, "polymerizable conditions" refer those conditions including a skilled artisan's selection of temperature, pressure, reactant concentrations, optional solvent/diluents, reactant mixing/addition parameters, and other conditions within at least one polymerization reactor that are conducive to the reaction of one or more olefin monomers when contacted with an activated olefin polymerization catalyst to produce the desired polyolefin polymer. Such processes can be run in a batch, semi-batch, or continuous mode. Heterogeneous polymerization processes (such as gas phase and slurry phase processes) are preferred. A heterogeneous process is defined to be a process where the catalyst system is not soluble in the reaction media. Alternatively, the polymerization process is not homogeneous. A homogeneous polymerization process is defined to be a process where preferably at least 90 wt % of the product is soluble in the reaction media. Alternatively, the polymerization process is not a bulk process is particularly preferred. A bulk process is defined to be a process where monomer concentration in all feeds to the reactor is preferably 70 vol % or more). Alternatively, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt %, preferably less than 0.5 wt %, preferably less than 0 wt % based upon the weight of the solvents.

In a preferred embodiment, the feed concentration of the monomers and comonomers for the polymerization is 60 vol % solvent or less, preferably 40 vol % or less, or preferably 20 vol % or less, based on the total volume of the feedstream. Preferably the polymerization is run in a bulk process.

Preferred polymerizations can be run at any temperature and/or pressure suitable to obtain the desired ethylene polymers. Typical temperatures and/or pressures include a temperature in the range of from about 0° C. to about 300° C., preferably about 20° C. to about 200° C., preferably about 35° C. to about 150° C., preferably from about 40° C. to about 120° C., preferably from about 45° C. to about 80° C.; and at a pressure in the range of from about 0.35 MPa to about 10 MPa, preferably from about 0.45 MPa to about 6 MPa, or preferably from about 0.5 MPa to about 4 MPa.

In a typical polymerization, the run time of the reaction is up to 300 minutes, preferably in the range of from about 5 to 250 minutes, or preferably from about 10 to 120 minutes.

In some embodiments, hydrogen is present in the polymerization reactor at a partial pressure of 0.001 to 50 psig (0.007 to 345 kPa), preferably from 0.01 to 25 psig (0.07 to 172 kPa), more preferably 0.1 to 10 psig (0.7 to 70 kPa).

In one embodiment of the invention, the polymerization is performed in the gas phase, preferably in a fluidized gas bed process. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.

In another embodiment of the invention, the polymerization is performed in the slurry phase. A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers, along with catalysts, are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used, the process is typically operated above the reaction diluent critical temperature and pressure. Often, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is known in the art, and described in for instance U.S. Pat. No. 3,248,179. A preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. In one embodiment 500 ppm or less of hydrogen is added, or 400 ppm or less or 300 ppm or less. In other embodiments at least 50 ppm of hydrogen is added, or 100 ppm or more, or 150 ppm or more.

The slurry reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

In a preferred embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone.

In several classes of embodiments, the catalyst activity of the polymerization reaction is at least 4,250 g/g*cat or greater, at least 4,750 g/g*cat or greater, at least 5,000 g/g*cat or greater, at least 6,250 g/g*cat or greater, at least 8,500 g/g*cat or greater, at least 9,000 g/g*cat or greater, at least 9,500 g/g*cat or greater, or at least 9,700 g/g*cat or greater.

Polyolefin Products

In an embodiment, the process described herein produces homopolymers copolymers of one, two, three, four or more $C_2$ to $C_{40}$ olefin monomers, preferably $C_2$ to $C_{20}$ alpha olefin monomers. Particularly useful monomers include ethylene, propylene, butene, pentene, hexene, heptene, octene, nonene, decene, undecene, dodecene, isomers thereof and mixtures thereof.

Likewise, the process of this invention produces olefin polymers, preferably polyethylene and polypropylene homopolymers and copolymers. In a preferred embodiment, the polymers produced herein are homopolymers of ethylene or homopolymers of propylene.

Alternatively, the polymers produced herein are copolymers of a $C_2$ to $C_{40}$ olefin and one, two or three or more different $C_2$ to $C_{40}$ olefins, (where the $C_2$ to $C_{40}$ olefins are preferably $C_3$ to $C_{20}$ olefins, preferably are $C_3$ to $C_{12}$ alpha-olefin, preferably are propylene, butene, hexene, octene, decene, dodecene, preferably propylene, butene, hexene, octene, or a mixture thereof).

Alternatively, the polymers produced herein are copolymers of ethylene preferably having from 0 to 25 mole % (alternately from 0.5 to 20 mole %, alternately from 1 to 15 mole %, preferably from 3 to 10 mole %) of one or more $C_3$ to $C_{20}$ olefin comonomer (preferably $C_3$ to $C_{12}$ alpha-olefin, preferably propylene, butene, hexene, octene, decene, dodecene, preferably propylene, butene, hexene, octene, or a mixture thereof).

Blends

In another embodiment, the polymer (preferably the polyethylene or polypropylene) produced herein is combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1-esters, polyacetal, polyvinylidine fluoride, polyethylene glycols, and/or polyisobutylene.

Films

Specifically, any of the foregoing polymers or blends thereof may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents.

Test Methods $^1$H NMR

Unless otherwise indicated, 1H NMR data of non-polymeric compounds was collected at room temperature (~23° C.) in a 5 mm probe using a Bruker NMR spectrometer operating with a $^1$H frequency of 400 or 500 MHz. Data was recorded using a 30° flip angle RF pulse, 8 scans, with a delay of 5 seconds between pulses. Samples were prepared using approximately 5-10 mg of compound dissolved in approximately 1 mL of an appropriate deuterated solvent. Samples are referenced to residual proton of the solvents at 7.15, 7.24, 5.32, 5.98, and 2.10 for D5-benzene, chloroform, D-dichloromethane, D-1,1,2,2-tetrachloroethane, and $C_6D_5CD_2H$, respectively. Unless stated otherwise, NMR spectroscopic data of polymers was recorded in a 5 or 10 mm probe on the spectrometer at 120° C. using a $d_2$-1,1,2, 2-tetrachloroethane solution prepared from approximately 20 mg of polymer and 1 mL of solvent. Unless stated otherwise, data was recorded using a 30° flip angle RF pulse, 120 scans, with a delay of 5 seconds between pulses.

All reactions were performed in an inert $N_2$ purged glove box unless otherwise stated. All anhydrous solvents were purchased from Fisher Chemical and were degassed and dried over molecular sieves prior to use. Deuterated solvents were purchased from Cambridge Isotope Laboratories and dried over molecular sieves prior to use. n-Butyl lithium (2.5 M solution in hexane), methylmagnesium bromide (3.0 M solution in diethyl ether), dichloromethylsilane (Me(H)$SiCl_2$), and dichlorophenylsilane (Ph(H)$SiCl_2$) were purchased from Sigma-Aldrich, and hafnium tetrachloride ($HfCl_4$) 99+%, was purchased from Strem Chemicals and used as received. Lithium-n-propylcyclopentadienide was procured from Boulder Scientific. The $^1$H NMR measurements were recorded on a 400 MHz Bruker spectrometer.

Thermal Gravimetric Analysis (TGA)

Thermal stability results were recorded on Q5000 TGA. Ramp rate was 5° C./min, temperature range was from 25° C. to 800° C. All the samples were tested in both air and nitrogen.

Molecular Weight, Comonomer Composition, and Long Chain Branching Determination

Unless otherwise indicated, the distribution and the molecular weights (Mw, Mn, Mw/Mn, etc.), the comonomer content ($C_2$, $C_3$, $C_6$, etc.) and the branching index (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. Given amount of polymer sample is weighed and sealed in a standard vial with 80-μL flow marker (Heptane) added to it. After loading the vial in the autosampler, polymer is automatically dissolved in the instrument with 8 ml added TCB solvent. The polymer is dissolved at 160° C. with continuous shaking for about 1 hour for PE samples. The TCB densities used in concentration calculation are 1.463 g/ml at about 23° C. and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: c=βI, where β is the mass constant determined with PE. The mass recovery is calculated from the ratio of the integrated area of the concentration chromatography over elution volume and the injection mass which is equal to the predetermined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS},$$

where the variables with subscript "PS" stand for polystyrene while those without a subscript are for the test samples. In this method, $\alpha_{PS}$=0.67 and $K_{PS}$=0.000175 while α and K are for other materials as calculated and published in literature (Sun, T. et al. *Macromolecules* 2001, 34, 6812.), except that for purposes of this invention and the claims thereto, α and K are 0.695 and 0.000579, respectively, for ethylene polymers; α and K are 0.705 and 0.0002288, respectively, for propylene polymers; and α and K are 0.695 and 0.000579*(1−0.0075*wt % hexene comonomer), respectively, for ethylene-hexene copolymers.

The comonomer composition is determined by the ratio of the IR5 detector intensity corresponding to $CH_2$ and $CH_3$ channel calibrated with a series of PE homo/copolymer standards whose nominal value are predetermined by NMR.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1−0.00126*w2) ml/mg and $A_2$=0.0015 where w2 is weight percent butene comonomer.

A high temperature Agilent viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the equation $[\eta]=\eta_S/c$, where c is concentration and is determined from the IR5 broadband channel output. The viscosity MW at each point is calculated as $M=K_{PS}M^{\alpha_{PS}+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as $$g'_{vis} = \frac{[\eta]_{avg}}{KM_v^\alpha},$$

where $M_v$ is the viscosity-average molecular weight based on molecular weights determined by LS analysis and the K and α are for the reference linear polymer, which, for purposes of this invention and claims thereto, α=0.705 and K=0.000262 for linear propylene polymers, α=0.695 and K=0.000181 for linear butene polymers, α=0.695 and K=0.000579 for linear ethylene polymers, except that α is 0.695 and K is 0.000579*(1−0.0087*w2+0.000018*(w2)^2) for ethylene-butene copolymer where w2 is weight percent butene comonomer, α is 0.695 and K is 0.000579*(1−0.0075*w2) for ethylene-hexene copolymer where w2 is weight percent hexene comonomer, and α is 0.695 and K is 0.000579*(1−0.0077*w2) for ethylene-octene copolymer where w2 is weight percent octene comonomer. Concentrations are expressed in $g/cm^3$, molecular weight is expressed in g/mole, and intrinsic viscosity (hence K in the Mark-Houwink equation) is expressed in dL/g unless otherwise noted. All molecular weights are weight average unless otherwise noted. All molecular weights are reported in g/mol unless otherwise noted.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

All manipulations were performed in an inert $N_2$ purged glove box unless otherwise stated. All anhydrous solvents were purchased from Fisher Chemical and were degassed and dried over molecular sieves prior to use. 1,1,3,3,5,5-hexaethoxy-1,3,5-trisilacyclohexane was purchased from Gelest Inc. and used as received. Toluene for the catalyst preparation was pre-dried with $Al_2O_3$ beads then dried over SMAO 757 before use. Deuterated solvents were purchased from Cambridge Isotope Laboratories and dried over molecular sieves prior to use.

PMO Synthesis/SD 10.5 g of 1,1,3,3,5,5-hexaethoxy-1,3,5-trisilacyclohexane were added to a flask with a stir bar. The pH was adjusted to about 12 by adding 5 mL of an ammonium hydroxide solution (28-30% $NH_3$) and 10 mL of deionized water. This solution was then placed in an oil bath at 90° C. and allowed to stir for 18 h. The flask was then removed from the oil bath and left under high speed stirring for another 24 h. This resulted in a milky white slurry which was then spray dried using a Buchi B-290 spray dryer with a 10% pump speed, an ultrasonic nozzle with power set at 5.1, a 180° C. inlet temperature, and a gas flow of 30 mm. 1.4 g of white free-flowing powder was obtained.

Supported Synthesis 0.5 g of spray dried MOS (27005-97) were added to a Celstir™ flask along with 10 mL of toluene. To this was added 0.75 g of MAO (30% in toluene) and stirred for 4 h in a 70° C. oil bath. The slurry was filtered and washed with hexane (2×10 mL), then dried under a vacuum overnight. The MAO treated MOS (0.6 g) was then placed in a Celstir™ flask with 10 mL toluene. To this slurry was added 10.4 mg of $(1,3-MeBuCp)_2ZrCl_2$ from a stock solution which was then stirred for 2 h. The slurry was then filtered and washed with hexane (2×10 mL). It was then dried under a vacuum overnight to obtain 0.45 g of a white powder. Comparative supported catalyst 2 was prepared using 1,3-MeBuCp$_2$ZrCl$_2$ and supported in the manner described in U.S. Pat. No. 6,180,736, Col. 17, lines 5-30.

Polymerization Process

A 2 L autoclave reactor was heated to 110° C. and purged with N$_2$ for at least 30 minutes. It was charged with dry NaCl (350 g; Fisher, S271-10 dehydrated at 180° C. and subjected to pump/purge cycles and finally passed through a 16 mesh screen prior to use) and SMAO ((5 g) at 105° C.) and stirred for 30 minutes. The temperature was adjusted to 85° C. At a pressure of 2 psig N$_2$, dry and degassed 1-hexene (2.0 mL) was added to the reactor with a syringe and then the reactor was charged with N$_2$ to a pressure of 20 psig. A mixture of H$_2$ and N$_2$ was flowed into the reactor (200 SCCM; 10% H$_2$ in N$_2$) while stirring the bed.

Catalysts indicated in the table above were injected into the reactor with ethylene at a pressure of 220 psig. Ethylene was allowed to flow over the course of the run to maintain constant pressure in the reactor. 1-hexene was fed into the reactor as a ratio to ethylene flow 0.1 g/g. Hydrogen was fed to the reactor at a ratio to ethylene flow 0.5 mg/g. The hydrogen and ethylene ratios were measured by on-line GC analysis. Polymerizations were halted after 1 hour by venting the reactor, cooling to about 23° C., and exposing the reactor to air. The salt was removed by washing with water two times. The polymer was isolated by filtration, briefly washed with acetone, and dried in air for at least for two days. Catalyst activities are reported in the table above. As can be seen, the inventive spray-dried example shows a catalyst activity greater than double as compared to the comparative example that was not spray-dried.

| Supported Catalyst Compound | Catalyst | Yield (g polyethylene) | Productivity (g/g cat) | Mw | Mn | PDI | Hexene wt % |
|---|---|---|---|---|---|---|---|
| 1 | Inventive | 152 | 9738 | 68221 | 27156 | 2.51 | 9.38 |
| 2 | Comparative | 88.1 | 4215 | 27039-137 | — | — | — |

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A spray-dried catalyst composition comprising the product of:
   a first olefin polymerization catalyst;
   a second olefin polymerization catalyst;
   at least one catalyst support comprising an organosilica material that is a polymer of at least one monomer of the Formula $[Z^1OZ^2SiCH_2]_3$ (I), wherein $Z^1$ is a hydrogen atom, a $C_1$-$C_4$ alkyl group or a bond to a silicon atom of another monomer and $Z^2$ is a hydroxyl group, a $C_1$-$C_4$ alkoxy group, a $C_1$-$C_6$ alkyl group, or an oxygen atom bonded to a silicon atom of another monomer; and
   optionally, at least one activator, wherein:
   the first olefin polymerization catalyst comprises one or more metallocene catalysts represented by Formula (VII):

$$T_yCp_mM^6G_nX^5{}_q \qquad (VII),$$

wherein each Cp is, independently, a cyclopentadienyl group which may be substituted or unsubstituted, $M^6$ is a Group 4 transition metal, G is a heteroatom group represented by the Formula $JR^*{}_z$, wherein J is N, P, O or S, R* is a linear branched or cyclic hydrocarbyl group having from one to twenty carbon atoms, and z is 1 or 2, T is a bridging group, y is 0 or 1, $X^5$ is a leaving group, m is 1 or 2, n is 0, 1, 2 or 3, q is 0, 1, 2 or 3, and the sum of m+n+q is equal to the oxidation state of the transition metal, and
   the second olefin polymerization catalyst comprises:
   (A) a compound represented by the Formula (VIII):

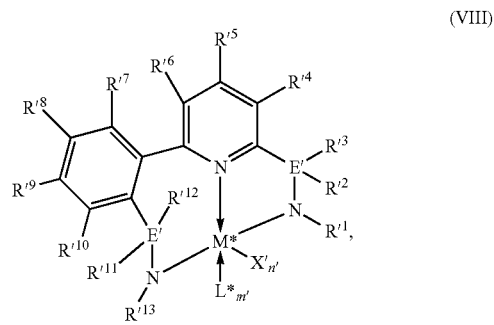

(VIII)

wherein:

M* is a Group 4 metal;

the E' groups are independently selected from carbon, silicon, or germanium;

each X' is an anionic leaving group;

L* is a neutral Lewis base, $R'^1$ and $R'^{13}$ are independently selected from the group consisting of hydrocarbyls, substituted hydrocarbyls, and silyl groups;

$R'^2$ and $R'^{12}$ are independently selected from the group consisting of hydrogen, hydrocarbyls, alkoxy, silyl, amino, aryloxy, substituted hydrocarbyls, halogen, and phosphino;

n' is 1 or 2;

m' is 0, 1, or 2; and two X' groups may be joined together to form a dianionic group;

two L* groups may be joined together to form a bidentate Lewis base;

an X' group may be joined to an L* to form a monoanionic bidentate group;

$R'^7$ and $R'^8$ may be joined to form a ring; and $R'^{10}$ and $R'^{11}$ may be joined to form a ring;

(B) a compound represented by the Formula (IX):

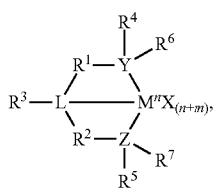

(IX)

wherein:

M is a Group 3-12 transition metal or a Group 13 or 14 main group metal;

each X is independently an anionic leaving group;

n is the formal oxidation state of M;

m is the formal charge of the ligand comprising Y, Z, and L;

Y is a Group 15 element;

Z is a Group 15 element;

$R^1$ and $R^2$ are independently a $C_1$ to $C_{20}$ hydrocarbon group, a heteroatom-containing group having up to twenty carbon atoms, silicon, germanium, tin, lead, phosphorus, or a halogen, wherein $R^1$ and $R^2$ may also be interconnected to each other;

$R^3$ is absent or a hydrocarbon group, hydrogen, a halogen, or a heteroatom-containing group;

$R^4$ and $R^5$ are independently an aryl group, a substituted aryl group, a cyclic alkyl group, a substituted cyclic alkyl group, a cyclic aralkyl group, a substituted cyclic aralkyl group, or a multiple ring system; and $R^6$ and $R^7$ are independently absent, or hydrogen, a halogen, a heteroatom, or a hydrocarbyl group; or (C) a compound represented by the Formula (X):

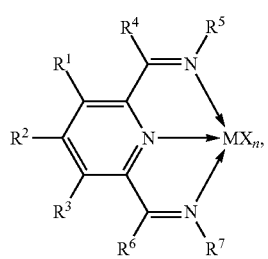

(X)

wherein:

M is a Group 7-9 transition metal;

X is an atom or group covalently or ionically bonded to the transition metal M;

n is 1, 2, 3, 4 or 5; and $R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more can be linked to form one or more cyclic substituents; and combinations thereof.

2. The catalyst composition of claim 1, wherein $Z^2$ is a hydroxyl group, a $C_1$-$C_4$ alkoxy group, or an oxygen atom bonded to a silicon atom of another monomer, and, optionally, $Z^1$ is a hydrogen atom, methyl, ethyl, or a bond to a silicon atom of another monomer.

3. The catalyst composition of claim 1, wherein the polymer further comprises a second distinct monomer of the Formula $[Z^1OZ^2SiCH_2]_3$ (I).

4. The catalyst composition of claim 1, wherein the organosilica material further comprises at least one monomer selected from the group consisting of:

a monomer of the Formula $Z^3OZ^4Z^5Z^6Si$ (II), wherein $Z^3$ is a hydrogen atom, a $C_1$-$C_4$ alkyl group, or a bond to a silicon atom of another monomer; and $Z^4$, $Z^5$ and $Z^6$ are independently selected from the group consisting of a hydroxyl group, a $C_1$-$C_4$ alkyl group, and a $C_1$-$C_4$ alkoxy group; and a monomer of the Formula $Z^7Z^8Z^9Si$—R—$SiZ^7Z^8Z^9$ (III), wherein $Z^7$ is a hydroxyl group, a $C_1$-$C_4$ alkoxy group, or an oxygen atom bonded to a silicon atom of another comonomer; $Z^8$ and $Z^9$ are independently a hydroxyl group, a $C_1$-$C_4$ alkoxy group, a $C_1$-$C_4$ alkyl group, or an oxygen bonded to a silicon atom of another monomer; and $R^1$ is selected from the group consisting of a $C_1$-$C_8$ alkylene group, a $C_2$-$C_8$ alkenylene group, and a $C_2$-$C_8$ alkynylene group.

5. The catalyst composition of claim 1, wherein the catalyst support has:

an average pore diameter between about 1 nm and about 100 nm;

a pore volume of about 0.01 cm$^3$/g to about 10 cm$^3$/g; and/or a surface area of about 1 m$^2$/g to about 2,500 m$^2$ g.

6. The catalyst composition of claim 1, wherein the spray-dried catalyst composition comprises the at least one activator, and wherein the at least one activator comprises methylalumoxane, modified methylalumoxane, ethylalumoxane, isobutylalumoxane, or mixtures thereof.

7. The catalyst composition of claim 1, wherein the catalyst composition is one or more spheroid particles.

8. The catalyst composition of claim 1, wherein each Cp is a cyclopentadiene, indene or fluorene, which may be substituted or unsubstituted, each $M^6$ is titanium, zirconium, or hafnium, and each $X^5$ is, independently, a halide, a hydride, an alkyl group, an alkenyl group or an arylalkyl group.

9. The catalyst composition of claim 1, wherein y is 1, m is 1, n is 1, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

10. The catalyst composition of claim 1, wherein
the one or more metallocene catalysts comprise dimethylsilyl (tetramethylcyclopentadienyl)(cyclododecylamido)titanium dimethyl; dimethylsilyl (tetramethylcyclopentadienyl)(cyclododecylamido)titanium dichloride; dimethylsilyl (tetramethylcyclopentadienyl)(t-butylamido)titanium dimethyl; dimethylsilyl (tetramethylcyclopentadienyl)(t-butyl amido)titanium dichloride; μ-$(CH_3)_2$Si(cyclopentadienyl)(1-adamantylamido)$M^7(R^5)_2$; μ-$(CH_3)_2$Si(3-tertbutylcyclopentadienyl)(1-adamantylamido)$M^7(R^{15})$; μ-$(CH_3)_2$(tetramethylcyclopentadienyl)(1-adamantylamido)$M^7(R^{15})$; μ-$(CH_3)_2$Si(tetramethylcyclopentadienyl)(1-adamantylamido)$M^7(R^{15})_2$; μ-$(CH_3)_2$C(tetramethylcyclopentadienyl)(1-adamantylamido)$M^7(R^{15})_2$; μ-$(CH_3)_2$Si(tetramethylcyclopentadienyl)(1-tertbutylamido)$M^7(R^{15})_2$; μ-$(CH_3)_2$Si (fluorenyl)(1-tertbutyl amido)$M^7(R^{15})_2$; μ—$(CH_3)_2$Si(tetramethylcyclopentadienyl)(1-cyclododecylamido)$M_7(R^{15})_2$; or μ-$(C_6H_5)_2$C(tetramethylcyclopentadienyl)(1-cyclododecylamido)$M^7(R^{15})_2$; wherein $M^7$ is selected from a group consisting of Ti, Zr, and Hf, and wherein $R^{15}$ is selected from halogen or $C_1$-$C_5$ alkyl.

11. The catalyst composition of claim 1, wherein the one or more metallocene catalysts comprise: bis(tetrahydroindenyl)Hf Me$_2$; bis(1-butyl,3-methylcyclopentadienyl)ZrCl$_2$; bis-(n-butylcyclopentadienyl)ZrCl$_2$; (dimethylsilyl)$_2$O bis(indenyl)ZrCl$_2$; dimethylsilyl(3-(3-methylbutyl)cyclopentadienyl)(2,3,4,5-tetramethylcyclopentadienyl)ZrCl$_2$; dimethylsilylbis(tetrahydroindenyl)ZrCl$_2$; dimethylsilyl-(3-phenyl-indenyl)(tetramethylcyclopentadienyl)ZrCl$_2$; dimethylsilyl(3-neopentylcyclopentadienyl)(tetramethylcyclopentadienyl)HfCl$_2$; tetramethyldisilylene bis(4-(3,5-di-tert-butylphenyl)-indenyl)ZrCl$_2$; cyclopentadienyl(1,3-diphenylcyclopentadienyl)ZrCl$_2$; bis(cyclopentadienyl) zirconium dichloride; bis(pentamethylcyclopentadienyl) zirconium dichloride; bis(pentamethylcyclopentadienyl) zirconium dimethyl; bis(pentamethylcyclopentadienyl) hafnium dichloride; bis(pentamethylcyclopentadienyl) zirconium dimethyl; bis(1-methyl-3-n-butylcyclopentadienyl)zirconium dichloride; bis(1-methyl-3-n-butylcyclopentadienyl)zirconium dimethyl; bis(1-methyl-3-n-butylcyclopentadienyl)hafnium dichloride; bis (1-methyl-3-n-butylcyclopentadienyl)zirconium dimethyl; bis(indenyl)zirconium dichloride; bis(indenyl)zirconium dimethyl; bis(tetrahydro-1-indenyl)zirconium dichloride; bis(tetrahydro-1-indenyl)zirconium dimethyl; dimethylsilylbis(tetrahydroindenyl)zirconium dichloride; dimethylsilylbis(tetrahydroindenyl)zirconium dimethyl; dimethylsilylbis(indenyl)zirconium dichloride; dimethylsilyl(bisindenyl) zirconium dimethyl; dimethylsilylbis(cyclopentadienyl) zirconium dichloride; or dimethylsilylbis(cyclopentadienyl) zirconium dimethyl.

12. The catalyst composition of claim 1, wherein the one or more metallocene catalysts comprise a first metallocene catalyst and a second metallocene catalyst independently selected from the group consisting of:
SiMe$_2$(Me$_4$Cp)(cC$_{12}$N)TiMe$_2$ and bis(1-Bu,3-Me-Cp) ZrCl$_2$; SiMe$_2$(Me$_4$Cp)(cC$_{12}$N)TiMe$_2$ and (SiMe$_2$) bis (indenyl)ZrCl$_2$; SiMe$_2$Cp)(cC$_{12}$N)TiMe$_2$ and (SiMe$_2$)$_2$O bis(indenyl)ZrCl$_2$; SiMe$_2$(Me$_4$Cp)(cC$_{12}$N) TiMe$_2$ and (SiMe$_2$)$_2$O bis(indenyl)ZrMe$_2$; SiMe$_2$ (Me$_4$Cp)(cC$_{12}$N)TiMe$_2$ and SiMe$_2$(3-neopentyl Cp) ((Me$_4$Cp)HfCl$_2$; SiMe$_2$(Me$_4$Cp)(cC$_{12}$N)TiMe$_2$ and SiMe$_2$(3-neopentylcyclopentadienyl)(Me$_4$Cp)HfMe$_2$; SiMe$_2$(Me$_4$Cp)(1-adamantylamido)TiMe$_2$ and bis(1-Bu,3-MeCp)ZrCl$_2$; and SiMe$_4$Cp)(1-t-butyl amido)TiMe$_2$ and bis(1-Bu, 3-MeCp)ZrCl$_2$.

13. The catalyst composition of claim 1, wherein the second olefin polymerization catalyst comprises a catalyst compound of the Formula (VIII), wherein M* is hafnium, each E' group is carbon, each X' is an alkyl, aryl, hydride, alkylsilane, fluoride, chloride, bromide, iodide, triflate, carboxylate, or alkylsulfonate, each L* is a an ether, amine, or thioether, each $R^{'1}$ and $R^{'13}$ is an aryl group, $R^{'7}$ and $R^{'8}$ are joined to form a six-membered aromatic ring with the joined $R^{'7}$ and $R^{'8}$ being —CH═CHCH═CH—, and $R^{'10}$ and $R^{'11}$ may be a five-membered ring with the joined $R^{'10}$ and $R^{'11}$ group being —CH$_2$CH$_2$— or a six-membered ring with the joined $R^{10}$ and $R^{11}$ group being —CH$_2$CH$_2$CH—).

14. The catalyst composition of claim 1, wherein the second olefin polymerization catalyst comprises a catalyst compound of the Formula (IX), wherein M is zirconium or hafnium, n is +3, +4, or +5, m is 0, −1, −2 or −3, L is nitrogen, Y is nitrogen or phosphorus, Z is nitrogen or phosphorus, $R^1$ and $R^2$ are a $C_2$ to $C_{20}$ alkyl, aryl or aralkyl group, $R^3$ is absent, a linear, cyclic, or branched alkyl $C_1$ to $C_{20}$ group, or hydrogen, $R^4$ and $R^5$ independently are a $C_1$ to $C_{20}$ hydrocarbon group, a $C_1$ to $C_{20}$ aryl group, or a $C_1$ to $C_{20}$ aralkyl group, and $R^6$ and $R^7$ are independently a linear, cyclic, or branched $C_2$ to $C_{20}$ alkyl group or absent.

15. The catalyst composition of claim 1, wherein the second olefin polymerization catalyst comprises a catalyst compound of the Formula (X) and n is 2 or 3.

16. A spray-dried catalyst composition comprising the product of:
a first olefin polymerization catalyst;
a second olefin polymerization catalyst;
at least one catalyst support comprising an organosilica material that is a polymer of at least one monomer of the Formula [$Z^1OZ^2SiCH_2$]$_3$ (I), wherein $Z^1$ is a hydrogen atom, a $C_1$-$C_4$ alkyl group or a bond to a silicon atom of another monomer and $Z^2$ is a hydroxyl group, a $C_1$-$C_4$ alkoxy group, a $C_1$-$C_6$ alkyl group, or an oxygen atom bonded to a silicon atom of another monomer; and
optionally, at least one activator, wherein:
the first olefin polymerization catalyst comprises one or more metallocene catalysts represented by Formula (VII):

$T_yCp_mM^6G_nX^5_q$ (VII), wherein each Cp is, independently, a cyclopentadienyl group which may be substituted or unsubstituted, $M^6$ is a Group 4 transition metal, G is a heteroatom group represented by the Formula JR*$_z$, wherein J is N, P, O or S, R* is a linear branched or cyclic hydrocarbyl group having from one to twenty carbon atoms, and z is 1 or 2, T is a bridging group, y is 0 or 1, $X^5$ is a leaving group, m is 1 or 2, n is 0, 1, 2 or 3, g is 0, 1, 2 or 3, and the sum of m+n+g is equal to the oxidation state of the transition metal, and the second olefin polymerization catalyst comprises:
a compound represented by the Formula (XI):

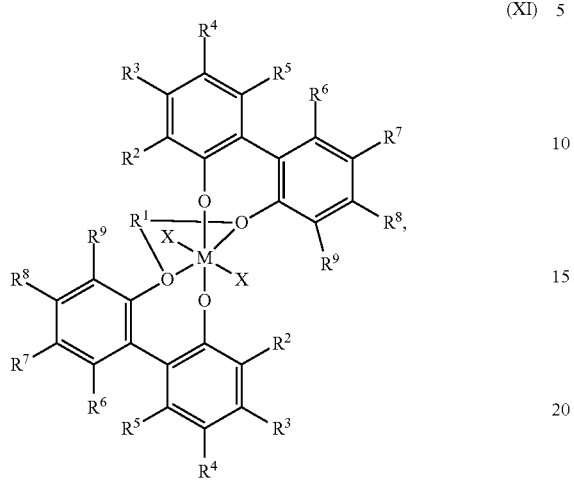

wherein:
M is selected from the group consisting of Ti, Zr, and Hf;
$R^1$ to $R^9$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is at least one leaving group.

17. A spray-dried catalyst composition comprising the product of:
a first olefin polymerization catalyst;
a second olefin polymerization catalyst;
at least one catalyst support comprising an organosilica material that is a polymer of at least one monomer of the Formula $[Z^1OZ^2SiCH_2]_3$ (I), wherein $Z^1$ is a hydrogen atom, a $C_1$-$C_4$ alkyl group, or a bond to a silicon atom of another monomer and Z is a hydroxyl group, a $C_1$-$C_4$ alkoxy group, a $C_1$-$C_6$ alkyl group, or an oxygen atom bonded to a silicon atom of another monomer; and
optionally, at least one activator, wherein:
the first olefin polymerization catalyst comprises one or more metallocene catalysts represented by Formula (VII):

$$T_yCp_mM^6G_nX^5_q \quad \text{(VII)},$$

wherein each Cp is, independently, a cyclopentadienyl group which may be substituted or unsubstituted, $M^6$ is a Group 4 transition metal, G is a heteroatom group represented by the Formula $JR^*_z$, wherein J is N, P, O or S, R* is a linear branched or cyclic hydrocarbyl group having from one to twenty carbon atoms, and z is 1 or 2, T is a bridging group, y is 0 or 1, $X^5$ is a leaving group, m is 1 or 2, n is 0, 1, 2 or 3, q is 0, 1, 2 or 3, and the sum of m+n+q is equal to the oxidation state of the transition metal, and the second olefin polymerization catalyst comprises:
(A) a compound represented by the Formula (XII):

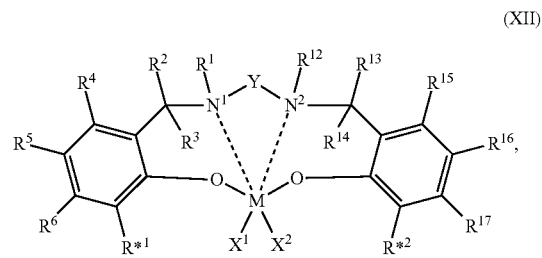

wherein:
each solid line represents a covalent bond and each dashed line represents a coordinative link;
M is a Group 3-6 transition metal;
$N^1$ and $N^2$ are nitrogen;
O is oxygen;
$X^1$ and $X^2$ are independently a univalent $C_1$ to $C_{20}$ hydrocarbyl radical, a functional group comprising elements from Groups 13-17, or $X^1$ and $X^2$ join together to form a $C_4$ to $C_{62}$ cyclic or polycyclic ring structure, provided however when M is trivalent $X^2$ is not present;
$R^1$ to $R^6$ and $R^{12}$ to $R^{17}$ are independently hydrogen, a $C_1$ to $C_{40}$ hydrocarbyl radical, a $C_1$ to $C_{40}$ substituted hydrocarbyl radical, two or more of $R^1$ to $R^6$ and $R^{12}$ to $R^{17}$ independently join together to form a $C_4$ to $C_{62}$ cyclic or polycyclic ring structure, or a combination thereof;
$R^{*1}$ and $R^{*2}$ independently comprise a bulky functional group, an electron withdrawing group, or a combination thereof; and
Y is a divalent $C_1$ to $C_{20}$ hydrocarbyl radical;
(B) a compound represented by the Formula (XIII):

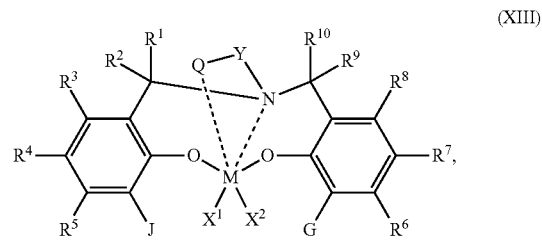

wherein:
M is a Group 4 transition metal;
$X^1$ and $X^2$ are independently a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure;
$R^1$ to $R^{10}$ are independently a hydrogen, a $C_1$ to $C_{40}$ hydrocarbyl radical, a $C_1$ to $C_{40}$ substituted hydrocarbyl radical, a heteroatom or a heteroatom-containing group, or two or more of $R^1$ to $R^{10}$ may independently join together to form a $C_4$ to $C_{62}$ cyclic or polycyclic ring structure, or a combination thereof;

Q is a neutral donor group;

J is a $C_7$ to $C_{60}$ fused polycyclic group, which optionally comprises up to 20 atoms from Groups 15 and 16, wherein at least one ring is aromatic and wherein at least one ring, which may or may not be aromatic, has at least five members;

G is as defined for J or may be hydrogen, a $C_1$ to $C_{60}$ hydrocarbyl radical, a $C_1$ to $C_{60}$ substituted hydrocarbyl radical, a heteroatom or a heteroatom-containing group, or may independently form a $C_4$ to $C_{60}$ cyclic or polycyclic ring structure with $R^6$, $R^7$, or $R^8$ or a combination thereof, or (C) a compound represented by the Formula (XIV):

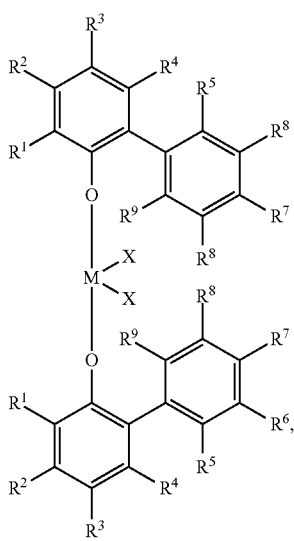

(XIV)

wherein:

M is selected from the group consisting of Ti, Zr, and Hf;

at least one of $R^1$ to $R^9$ is substituted with a moiety having the following structure (XV):

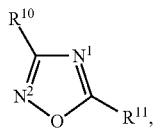

(XV)

wherein structure (XV) is attached at any one of $R^1$ to $R^9$ at the $R^{10}$ or $R^{11}$ position; at least one of nitrogen $N^1$ or $N^2$ of Structure (XV) forms a dative bond with M; and $R^1$ to $R^{11}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; X is a leaving group; and combinations thereof.

18. The catalyst composition of claim 17, wherein the second olefin polymerization catalyst comprises a catalyst compound of the Formula (XII), wherein $X^1$ and $X^2$ are benzyl radicals and Y is selected from the group consisting of $—CH_2CH_2—$, 1,2-cyclohexylene, and $—CH_2CH_2CH_2—$.

19. The catalyst composition of claim 17, wherein the second olefin polymerization catalyst comprises a catalyst compound of the Formula (XII), wherein $R^{*1}$ and $R^{*2}$ each comprises a cyclopentadienyl radical having a structure according to the Formula:

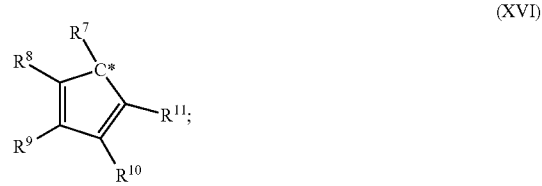

(XVI)

wherein:

C* indicates an attachment carbon of the radical;

$R^7$ is a $C_1$ to $C_{40}$ hydrocarbyl radical or a substituted $C_1$ to $C_{40}$ hydrocarbyl radical; and $R^8$ to $R^{11}$ are independently a hydrogen, a $C_1$ to $C_{40}$ hydrocarbyl radical, a substituted $C_1$, to $C_{40}$ hydrocarbyl radical, two or more of $R^1$ to $R^{17}$ independently join together to form a $C_4$ to $C_{62}$ cyclic or polycyclic ring structure, or a combination thereof.

20. The catalyst composition of claim 17, wherein the second olefin polymerization catalyst comprises a catalyst compound of the Formula (XIII), wherein the complex is represented by the Formulas (XVII) or (XVIII):

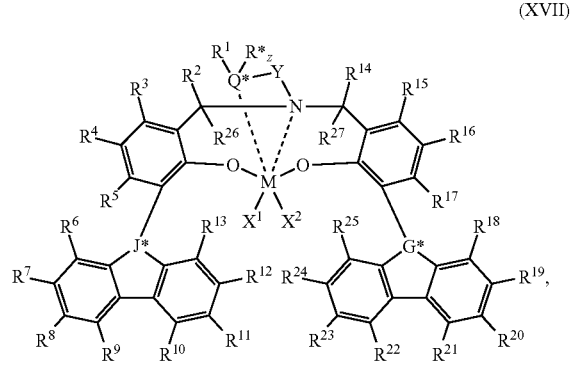

(XVII)

-continued (XVIII)

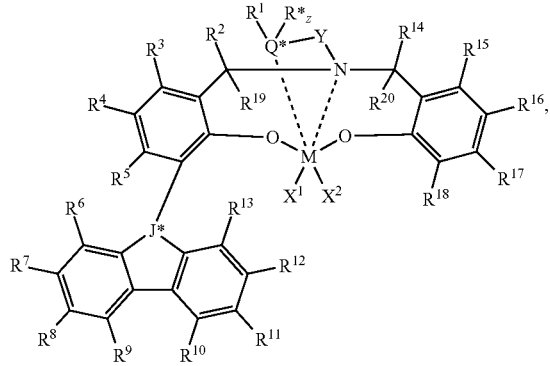

wherein:
M is Hf, Zr, or Ti;
$X^1$, $X^2$, $R^1$ to $R^{10}$, and Y are as defined in claim 19; R*, R", and $R^{11}$ to $R^{27}$ are independently a hydrogen, a $C_1$ to $C_{40}$ hydrocarbyl radical, a $C_1$ to $C_{40}$ substituted hydrocarbyl radical, a functional group comprising elements from Groups 13 to 17, or two or more of $R^1$ to $R^{27}$ may independently join together to form a $C_4$ to $C_{62}$ cyclic or polycyclic ring structure, or a combination thereof, or R1 and R* may independently join together to form a five- to eight-membered heterocycle; Q* is a group 15 or 16 atom, z is 0 or 1; J* is CR" or N; and G* is CR" or N.

21. The catalyst composition of claim 17, wherein the second olefin polymerization catalyst comprises a catalyst compound of the Formula (XIII), wherein the catalyst complex is represented by the Formulas (XIX) or (XX):

(XIX)

or (XX)

wherein Y is a divalent $C_1$ to $C_3$ hydrocarbyl, $Q^1$ is $NR'_2$, OR', SR', $PR'_2$, wherein R' is as defined for $R^1$ in claim 19, M is Zr, Hf, or Ti and each X is, independently, as defined for X in claim 17.

22. The catalyst composition of claim 17, wherein the second olefin polymerization catalyst a catalyst compound of the Formula (XIV), wherein the catalyst complex is represented by the Formula (XXI):

(XXI)

wherein M is selected from the group consisting of Ti, Zr, and Hf;
$R^2$ to $R^{10}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is least one leaving group.

23. A process to produce a polyolefin polymer comprising:
contacting under polymerizable conditions, in a gas phase process or a slurry phase process, olefin monomers with the catalyst composition of claim 1 and recovering the polyolefin polymer.

24. The catalyst composition of claim 1, wherein the catalyst composition comprises the at least one activator.

\* \* \* \* \*